United States Patent [19]

Quaglia

[11] Patent Number: 5,739,959
[45] Date of Patent: Apr. 14, 1998

[54] AUTOMATIC FAST FOCUSING INFINITELY VARIABLE FOCAL POWER LENS UNITS FOR EYEGLASSES AND OTHER OPTICAL INSTRUMENTS CONTROLLED BY RADAR AND ELECTRONICS

[75] Inventor: Lawrence D. Quaglia, 917 Quincy Ave., Bronx, N.Y. 10465

[73] Assignee: Lawrence D. Quaglia, Bronx, N.Y.

[21] Appl. No.: 512,085

[22] Filed: Aug. 7, 1995

Related U.S. Application Data

[62] Division of Ser. No. 94,852, Jul. 20, 1993, Pat. No. 5,440,357.

[51] Int. Cl.[6] ............................ G02B 1/06; G02B 3/12
[52] U.S. Cl. .................................. 359/666; 359/665
[58] Field of Search .............................. 359/665, 666

[56] References Cited

U.S. PATENT DOCUMENTS

| | | | |
|---|---|---|---|
| 3,494,687 | 2/1970 | Weiner | 359/665 |
| 4,477,158 | 10/1984 | Pollock et al. | 359/666 |
| 5,138,494 | 8/1992 | Kurtin | 359/665 |
| 5,229,885 | 7/1993 | Quaglia | 359/666 |
| 5,440,357 | 8/1995 | Quaglia | 359/665 |
| 5,443,506 | 8/1995 | Garabet | 359/666 |

*Primary Examiner*—David C. Nelms
*Assistant Examiner*—Evelyn A. Lester
*Attorney, Agent, or Firm*—Lawrence D. Quaglia

[57] ABSTRACT

The present invention provides new variable focal power Lens Units in an eyeglass frame, controlled by radar and electronics for the visually impaired, consisting of a Neodymium Iron Boron ring magnet in a flexible rubber binder having a convention pole e.g. North, (facing the electromagnet) attached to the stabilizer ring on the forward movable lens. Forward movement to supply positive focal power is achieved by repulsion coming from an electro ring magnet with a Barium Ferrite core in a flexible rubber binder, having a copper coil around the core creating the electromagnetic force when energized by the current controlled power supply. Rearward movement to supply negative focal power is achieved by attraction coming from the electro ring magnet in reverse operation.

The second Lens Unit consists of an automatic fast focusing infinitely variable focal power Lens Unit consisting of a permanent magnet with an additional copper coil surrounding it to energize a clear magnetic fluid oil to have e.g. a North pole facing rearward and having the electromagnet on the rearward lens generating a South pole when in operation to provide movement of the lens members.

22 Claims, 14 Drawing Sheets

AUTOMATIC FAST FOCUSING INFINITELY VARIABLE FOCAL POWER LENS UNITS FOR EYEGLASSES AND OTHER OPTICAL INSTRUMENTS CONTROLLED BY RADAR AND ELECTRONICS

The following is a divisional application of U.S. Ser. No. 08/094,852, filed on Jul. 20, 1993 and is now U.S. Pat. No. 5,440,357, is herein incorporated by reference.

FIELD OF INVENTION

This invention provides for variable focal power lens adjustment automatically as the eyes are focused straight ahead on an object or at distant points. It also gives repetitive performance on a daily basis over varying temperatures. The Lens Units are fast-acting and the precision components provide for standardization in replacement of assemblies

BACKGROUND OF THE INVENTION

This patent is dedicated to the memory of Rose Quaglia, for her support and encouragement.

There have been various variable focal power Lens Units using a clear liquid between lenses to try to vary the focal power. Examples of such variable focal power lenses are those disclosed in U.S. Pat. Nos. 4,989,958 to Hamada et al. dated Feb. 5, 1991; 4,890,903 to Treisman et al., dated Jan. 2, 1990; 4,477,158 to Pollock et al. dated Oct. 16, 1984; 4,261,655 to Honigsbaum dated Apr. 14, 1981; 4,181,408 to Senders dated Jan. 5, 1980; 258,325 to Mitchell dated Sep. 15, 1926; 1,515,389 to Hopkins dated Nov. 11, 1924.

U.S. Pat. No. 4,913,536 to Barnea dated Apr. 3, 1990, discloses two lenses separated with a grommet, one of which is flexible having focal power varied by pumping in or pumping out fluid with the flexible lens deforming giving that variable focal power. They have many variables in their operation and at best give questionable performance. Review of the previous art enclosed will reveal this. Another lens device is a product called Varilux. This product uses a tapered lens.

In use the human eye goes from bottom to top to focus on objects of various distances. This is the basis for bifocals, trifocals, etc. The present invention is far superior in that the eye does not have to be in a certain limited position for operation.

The eye does not have to wait for the fluid to be pumped in, which takes time. The present invention is fast-acting, keeping up with the eyes. The eyeglasses of the present invention fit the normal function of the eyes, as compared to past inventions where the individual's eyes have to adjust to the eyeglasses' principals for passable operation. A pair of the present invention eyeglasses are to replace multiple pairs of eyeglasses for most people wearing bifocals, etc. For an individual needing eyeglasses, one set of the present invention eyeglasses can be used for present and for future use, with minor adjustment by an optometrist if eye condition should change. The lenses will automatically focus for the object distance instantaneously, due to the electronic components, before the eyes are aware of the change in distance of objects. The present invention consisting of the manually adjustable model for eye measurement can be used with sighting devices to increase their value on weapons systems, e.g. bomb sights, artillery sighting lenses, etc.

This benefit can be realized after the target is sighted in, then the Variable Focal Point Lens Unit is connected so that anyone with a vision problem can focus in on the target without losing range for accuracy. The Lens Units can also be applied to gas masks for vision correction as well as to telescopic scopes.

SUMMARY

The present invention offers improvement over prior art. The Lens Units are designed to better and different operating principles along with precision and standardization of performance between the eyeglasses and the Lens Units for other variable focal power products.

The present invention will supply an infinitely variable focal power lens unit to match the focusing of the human eye. The negative focal power Lens Units mentioned and described in the embodiment section can be used for individuals that are nearsighted. As described in the embodiment section, the positive focal power Lens Units are for individuals requiring focal power adjustment for farsightedness due to age, so they can properly read, etc. This invention will supply uniform results for Lens Units. These Lens Units are standardized in design and performance which is not true for the prior art. The Lens Units of the present invention are precision units actuated by precision movement of proportional solenoids with matched precision movement. The solenoids are controlled by output of a precision Current controlled power supply. An Electronic Converter actuates and controls the power supply. The Electronic Converter is precisely controlled by a Radar sending and receiving unit. The prior art in no way can match the performance of this invention. This invention will provide a much needed benefit for people who wear bifocals, trifocals, etc.

There is also a benefit for a military lighting devices, bomb sights, sighting scopes, etc.

SUMMARY

The present invention provides for a better lens system used in a newly designed Vari-lens™ Phoropter. It features a digital readout in diopters either Positive or Negative for Positive or Negative focal power with an intermediate Zero position. Therefore for the first time establishing a much more precise measurement than anything that is currently available today for each eye respectively. Constant ratios between the forward and rearward lenses establish a definite relationship to the diopter values for either Positive or Negative focal power. This relationship is achieved through direct gearing and movable gear racks which move the forward and rearward lenses in precise ratios to each other. An encoder coupled to the rear gear rack drive gear shaft supplies an electrical DC square wave segment of voltage that is displayed on the Positive to Negative totalizer readout unit for the right and left eyes respectively. The new Vari-Lens Phoropter digital readout displays for each eye is programmable with a scaling factor to break down the diopter values to a much finer amount than which is currently available if the eye doctor so desires. The prescription amount in diopters will be displayed on the Positive to Negative totalizer display units for each eye respectively.

This newly invented Vari-Lens Phoropter will reduce to a minimum the measurement time to about 10–20% compared to a standard phoropter unit.

This new invention is adjusted by right and left adjustment knobs for the right and left eyes respectively. A new automatic fast focusing lens is included in this application to supply positive focal power for people who have hyperopia. This new lens unit is a more compactly sized unit than the previous invention. It operates with the same current controlled power supply and radar microchip circuitry as used in the previous invention. This new lens unit uses a Neodymium Iron Boron ring magnet in a flexible rubber binder having a conventional pole e.g., North, (facing the electromagnet) attached to the stabilizer ring on the forward movable lens. Forward movement to supply Positive focal power is achieved by repulsion coming from an electro ring magnet with a Barium Ferite core in a flexible rubber binder, having a copper coil around the core creating the electromagnetic force when energized by the current controlled power supply. This electromagnet is mounted to the inner surface of the rigid rear lens and establishes a radialized ringed magnet with a convention pole e.g., North to repel e.g., the North Pole of the radialized ringed magnet to the forward lens.

When the lens is used for Negative focal power the electromagnet is fastened to the forward lens which is rigid and the radialized ringed magnet is now attached to the inner surface of the rearward lens which is flexible in operation. In this lens setup e.g., the North Pole is on the radialized ringed magnet facing the electromagnets e.g., weak South Pole.

Any residual magnetism in the electromagnet is eliminated by a reversal of current flow polarity when the movable lens returns to its starting position. In this arrangement the forward lens is stationery and the rearward lens is flexible and moves forward creating the necessary focal power for people who have myopia. This present invention will greatly benefit both doctors and patients for eye prescription measurement and use of the automatic fast focusing lenses that are to be used in the eyeglasses for the visual impaired.

New automatic fast focusing Lens Units are included and described in this patent application to supply positive and negative focal power for people who have hyperopia and myopia respectively. These new Lens Units are more compactly sized units than the previous invention. They operate with the same current controlled power supply and radar microchip circuitry as used in the previous invention. These new lens units use a Neodymium Iron Boron ring magnet in a flexible rubber binder having a conventional pole e.g., North, (facing the electromagnet) attached to the stabilizer ring on the forward movable lens. Forward movement to supply Positive focal power is achieved by repulsion coming from an electro ring magnet with a Barium Ferite core in a flexible rubber binder, having a copper coil around the core creating the electromagnetic force when energized by the current controlled power supply. This electromagnet is mounted to the inner surface of the rigid rear lens and establishes a radialized ringed magnet with a convention pole e.g., North to repel e.g., the North Pole of the radialized ringed magnet to the forward lens.

When the lens is used for Negative focal power the electromagnet is fastened to the forward lens which is rigid and the radialized ringed magnet is now attached to the inner surface of the rearward lens which is flexible in operation. In this lens setup e.g., the North Pole is on the radialized ringed magnet facing the electromagnets e.g., weak South Pole.

Any residual magnetism in the electromagnet is eliminated by a reversal of current flow polarity when the movable lens returns to its starting position. In this arrangement the forward lens is stationery and the rearward lens is flexible and moves forward creating the necessary focal power for people who have myopia. This present invention will greatly benefit both doctors and patients for eye prescription measurement and use of the automatic fast focusing lenses that are to be used in the eyeglasses for the visual impaired.

Another Lens Unit of similar construction to the above Lens Units consists of using a permanent magnet with an additional copper coil surrounding it to energize a clear magnetic fluid oil to have e.g. a North pole facing rearward and having the electromagnet on the rearward lens generating a South pole when in operation to provide movement of the lens members.

BRIEF DESCRIPTION OF DRAWINGS

A Numerical Index:

For FIGS. 1–14, 1 and 2 are lenses, 3 is the liquid, 4 is the hinge pivot, 5 is the C-shaped Ring reservoir, 6 and 7 are lens outer surfaces, 8 and 9 are lens inner surfaces, 10 is outer surface of ring 5, 11 is reservoir for fluid 3, 12 is inner surface of 5 for reservoir, 13 and 14 are connection points for 1 and 5, 2 and 5, 15 is sealing plug for 5. No. 16 is sliding joint, 17 is sliding joint contact surface. No. 18 are channels, 19 is radius stabilizer ring. No. 51 is pivot connection fastened to Lens 1. No. 55 is mounting flange. No. 68 is internal power wire harness to the Hollow Proportional Solenoids 35 and 36. No. 70 is connection point for power, from power supply 37 to 68, to activate the Hollow Proportional Solenoids 35 and 36 respectively for Lens Units 31 and 32 respectively. Nos. 71 and 72 are fluid ports, 73 are rear ends and 74 are plunger ends of Hollow Proportional Solenoids 35 and 36 in FIGS. 13 and 14. Positive focal power consists of having outer side of lens radius away from eye smaller than the inner side of the lens radius near the eye. Negative focal power has outer radius of the lens larger and inner radius of the lens smaller.

Numerical Index

Number 80 is the Vari-Lens™ Phoropter unit assumbly.

Figure 18:
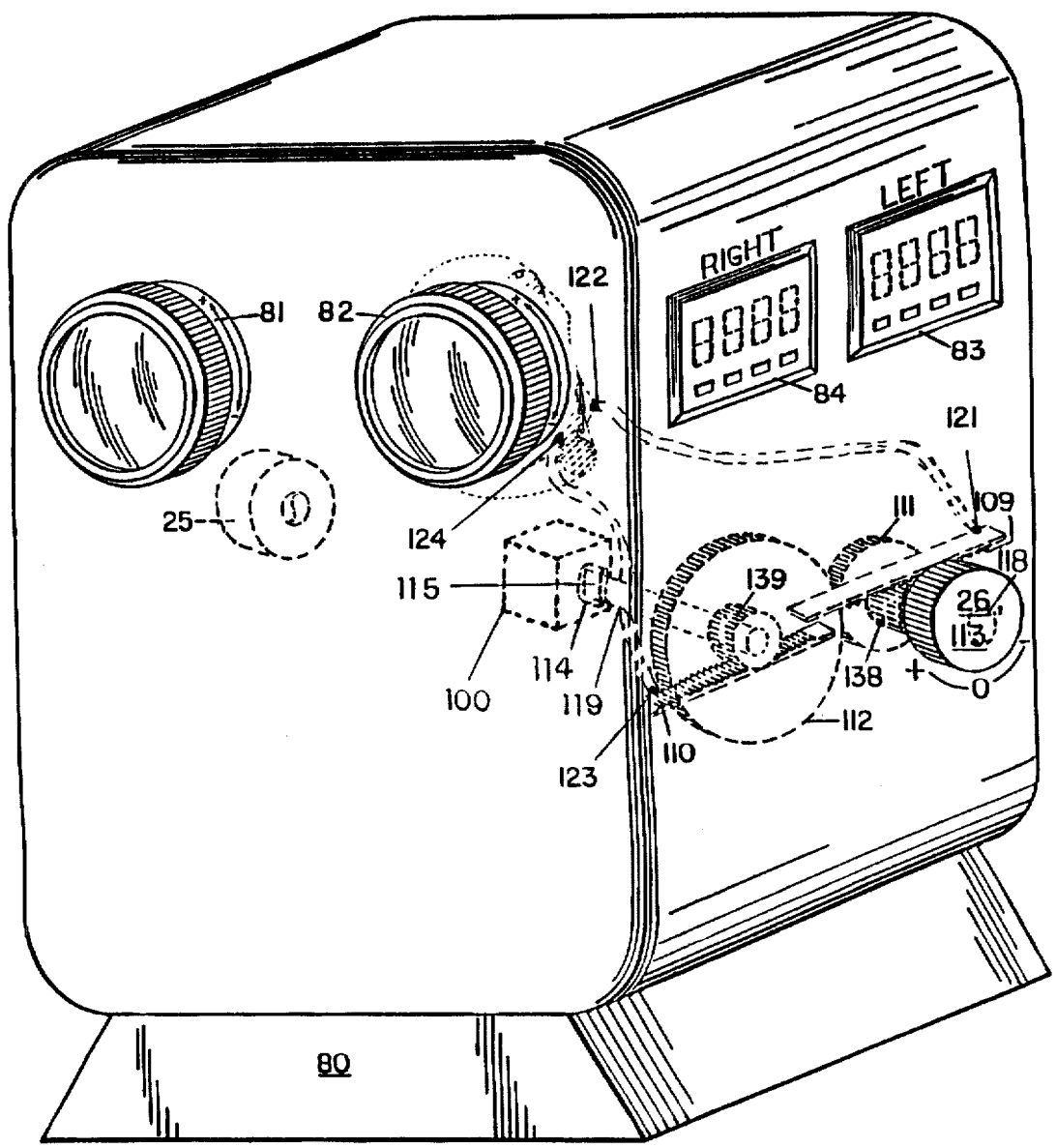

Number 81 is the left eye input opening to lens unit of FIG. 18.

Number 82 is is the right eye input opening to lens unit of FIG. 18.

Number 83 is the left eye LED read-out display.

Number 84 is the right eye LED read-out display.

Figure 19:
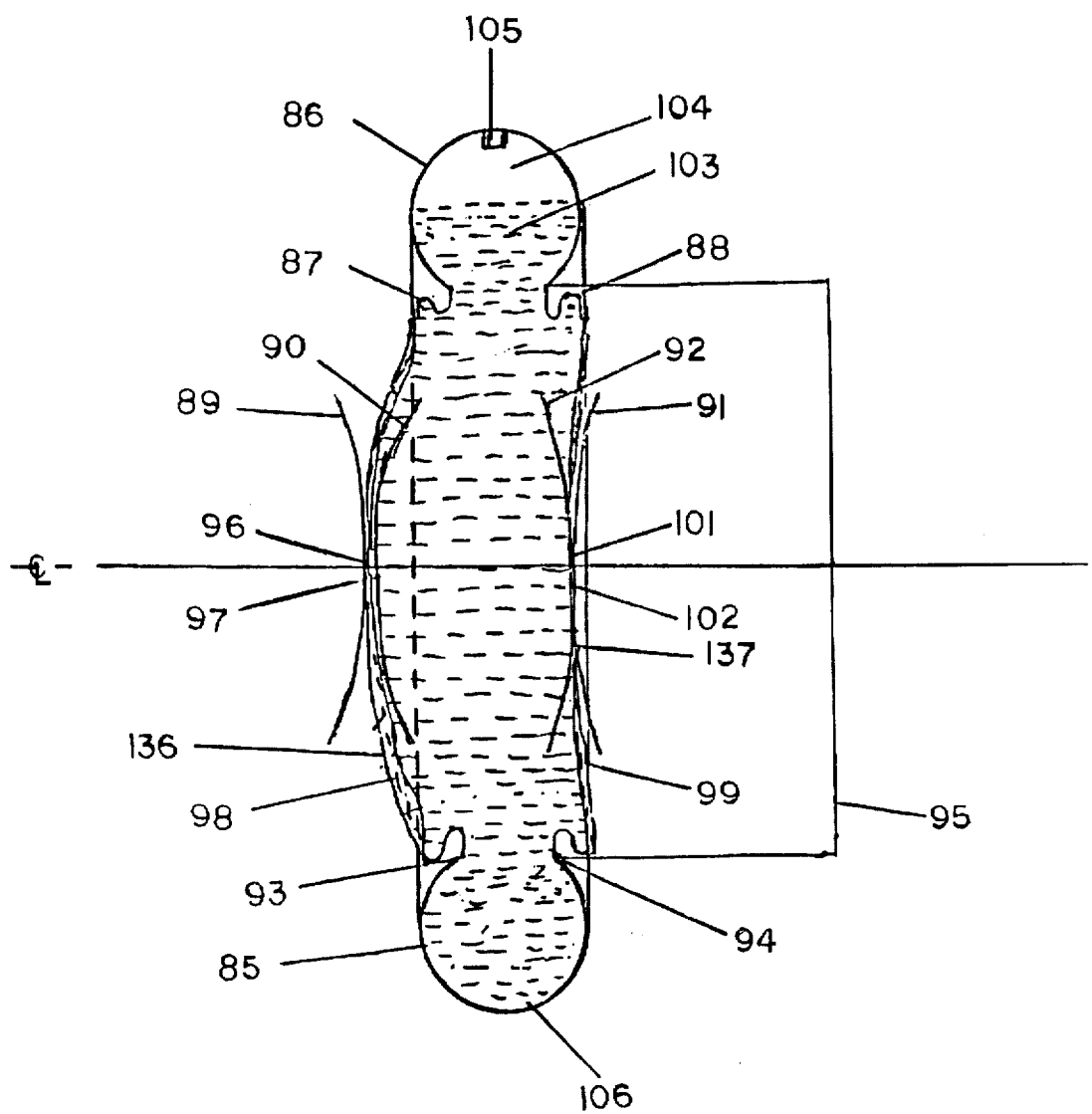
Figure 20:
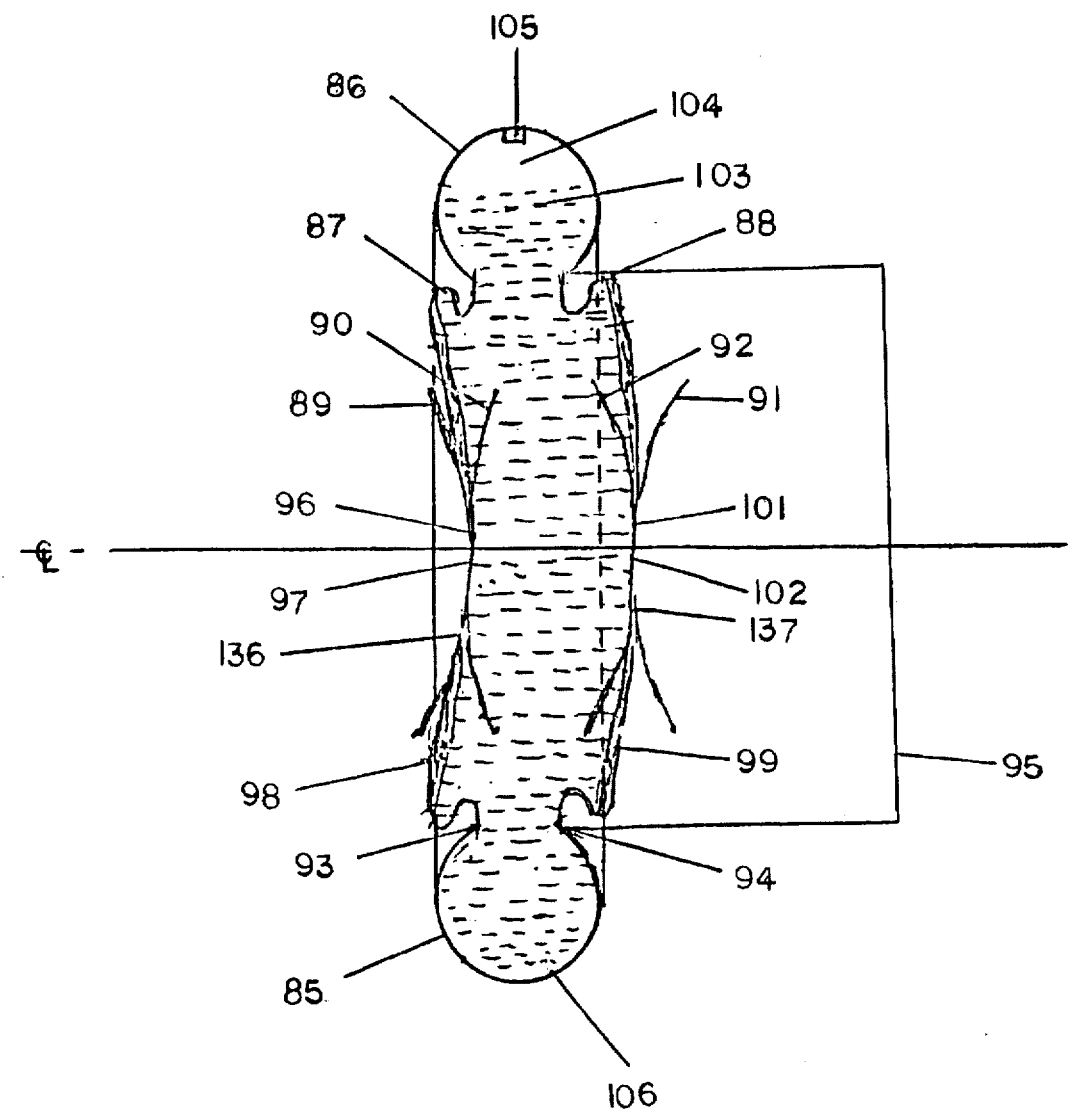

Number 85 is the fluid reservoir for FIGS. 19 and 20 respectively.

Number 86 is the outer surface of the fluid reservoir 5.

Number 87 is the forward S-shaped circular expansion channel.

Number 88 is the rearward S-shaped circular expansion channel.

Number 89 is the forward external stabilizer ring of lens element 136.

Number 90 is the forward internal stabilizer ring of lens element 136.

Number 91 is the rearward external stabilizer ring of lens element 137.

Number 92 is the rearward internal stabilizer ring of lens element 137.

Number 93 is is the forward connection point of the reservoir 5 to the forward lens element S-shaped channel outer periphery 87.

Number 94 is the rearward connection point of reservoir 5 to the S-shaped channel outer periphery 88.

Number 95 is the flange for mounting of the lens units of FIGS. 18 and 19 respectively.

Number 96 is the outer surface of the forward lens element 136 for FIGS. 19 and 20 respectively.

Number 97 is the inner surface of the forward lens element 137 of FIGS. 19 and 20 respectively.

Numbers 98 are the radial channels in the forward lens element 136.

Numbers 99 are the radial channels in the rearward lens element 137.

Numbers 100 are the encoders that supply the square wave DC output signal voltage for the digital totalizer read-out displays 83 and 84 respectively.

Number 101 is the outer surface of the rearward lens element 137 of FIGS. 19 and 20 respectively.

Number 102 is the inner surface of the rearward lens element 137 of FIGS. 19 and 20 respectively.

Number 103 is the clear fluid oil.

Number 104 is the inner reservoir chamber for the fluid oil 103.

Number 105 is the sealing and filling plug for reservoir 85 of FIGS. 19 and 20 respectively.

Number 106 is the inner surface of reservoir 85.

Number 107 is a lens element of FIG. 19 shown with positive focal power.

Number 108 is a typical positive to negative totalizer read-out display unit used in the phoropter FIG. 118.

Figure 21:
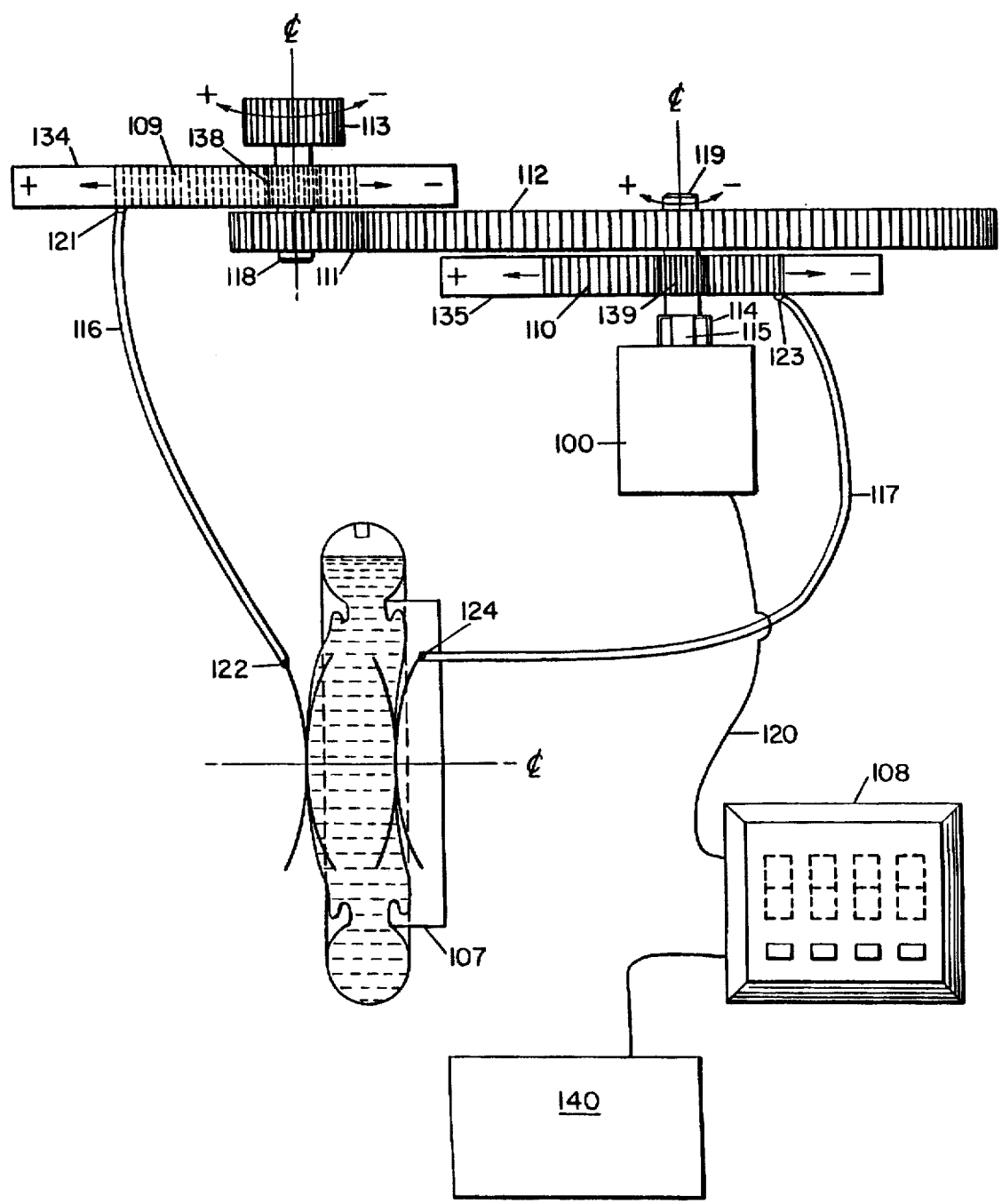

Number 109 is a typical forward gear rack as used in the unit of FIG. 18 and displayed in FIG. 21.

Number 110 is a typical rearward gear rack as used in unit of FIG. 18 and displayed in FIG. 21.

Number 111 is the driving gear on pinion drive shaft 118 to drive rearward driven gear 112 which has the rearward gear pinion attached to said shaft 119 which in turn drives gear rack 110 and has coupling 114 also attached to outer end of said shaft 119 to drive encoder 100 shaft 115.

Number 112 is the driven gear on the rearward driving gear rack shaft 119 that in turn drives the coupled encoder 100.

Number 113 is a typical adjustment knob as used in FIG. 18.

Number 114 is a coupling from driven gear rack shaft 112 that drives the encoder 100 shaft 115.

Number 115 is the encoder drive shaft extension from the encoder 100.

Number 116 is the forward connection arm extension connecting the forward gear rack to the outer stabilizer ring as shown in FIGS. 19 and 20 respectively.

Number 117 is the rearward connection arm extension connecting the rearward gear rack to the outer stabilizer ring on lens units as shown in FIGS. 19 and 20.

Number 118 is the forward gear rack drive shaft.

Number 119 is the rearward gear rack driven shaft.

Number 120 is the connection cable wire harness from the encoder 100 to the totalizer read-out display 108 as illustrated in FIG. 21.

Number 121 is the connection point between 109 and 116.

Number 122 is the connection point between 116 and 89.

Number 123 is the connection point between 110 and 117.

Number 124 is the connection point between 117 and 91.

Number 125 is the permanent Neodymium Iron Boron permanent radialized ring magnet.

Number 126 is the core for the electro magnet assembly.

Number 127 is the copper coil around the core of 126 to power and complete the electro magnet assembly.

Number 128 is the wire harness from the electro magnet assembly 127 to connection point 70.

Number 129 is the connecting wire to cathode coil 131 to 130 connection point.

Number 130 is the connection point for coil wire from cathode coil 131.

Number 131 is the cathode coil.

Number 132 is the annode coil.

Number 133 is the clear magetic fluid.

Number 134 is the forward gear rack slide track as illustrated in FIG. 21.

Number 135 is the rearward gear rack slide track as illustrated in FIG. 21.

Number 136 is the forward lens element as illustrated in FIGS. 19 and 20.

Number 137 is the rearward lens element as illustrated in FIGS. 19 and 20.

Number 138 is the forward gear rack drive pinion as illustrated in FIG. 21.

Number 139 is the rearward gear rack drive pinion as illustrated in FIG. 21.

Number 140 is the DC portable power supply to power the encoders 100 and 100 and the totalizer read-out display units 83 and 84.

Figure 1:
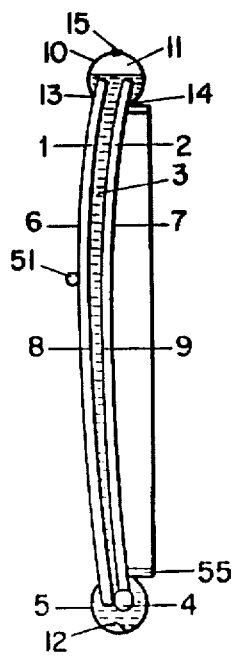

FIG. 1 shows a Lens Unit supplying positive focal power when open due to difference of the radii of inner and outer Lens Unit surfaces 6 and 7, and with a clear liquid in between the two clear lenses having the same index of refraction.

Figure 2:
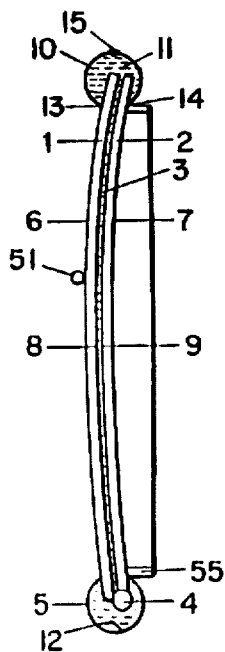

FIG. 2 shows the Lens Unit of FIG. 1 closed supplying no positive focal power, depending on design of the inner and outer radii there is a very thin amount of liquid in-between the clear lenses.

Figure 3:
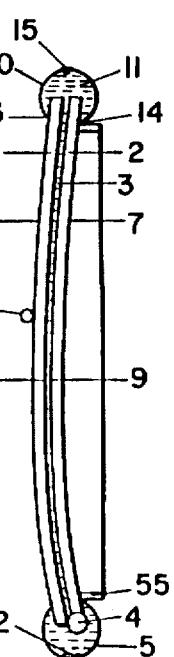

FIG. 3 shows a Lens Unit open supplying positive focal power with difference in radii of the Lens Unit enhanced by having a higher index of refraction of the liquid 3 than the lenses 1 and 2. The difference in radii of the Lens Unit is in between the lenses 1 and 2 on surfaces 8 and 9. The difference in radii can also be on the outer surfaces of lenses 1 and 2 on surfaces 6 and 7.

Figure 4:
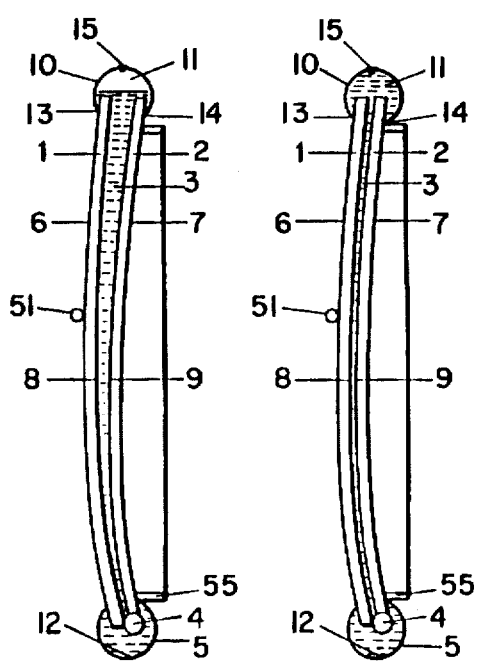

FIG. 4 shows the Lens Unit of FIG. 3 closed supplying no focal power, with a very thin amount of clear liquid in between the clear lenses. The liquid has a higher index of refraction than the clear lenses.

Figure 5:
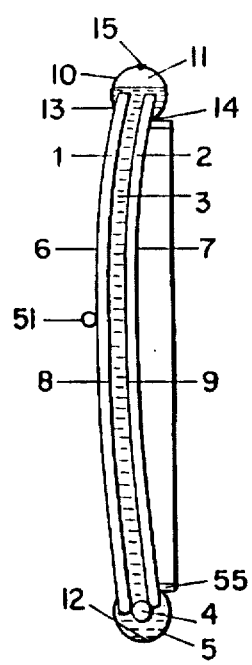

FIG. 5 shows a Lens Unit open supplying none or very little of positive focal power with equal index of refraction for lenses and liquid.

Figure 6:
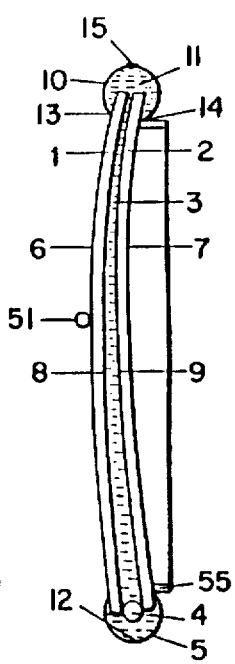

FIG. 6 shows the Lens Unit of FIG. 5 closed supplying positive focal power due to the difference in radii by special design of the lenses 1 and 2 and liquid in between.

Figure 7:
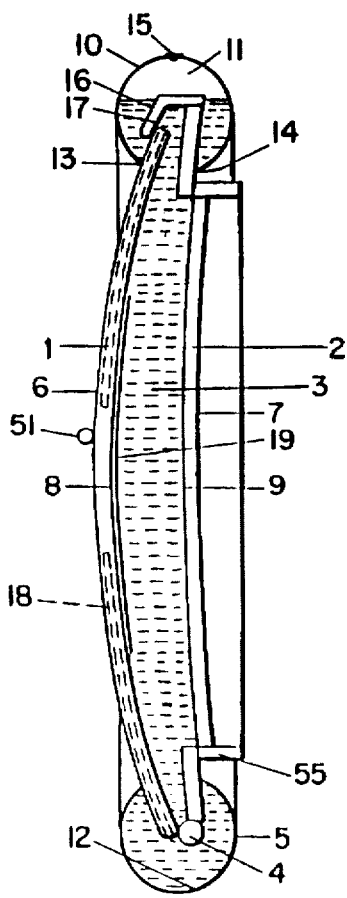

FIG. 7 shows positive focal power using flexible forward lens with Lens Unit open outwardly.

Figure 8:
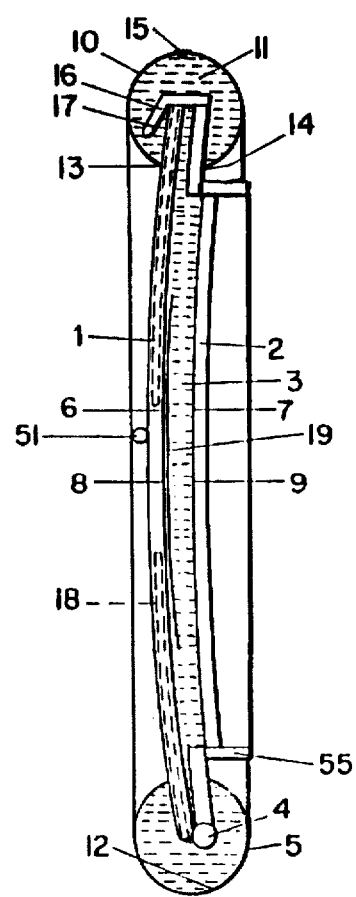

FIG. 8 shows the Lens Unit of FIG. 7 closed inward with no focal power.

Figure 9:
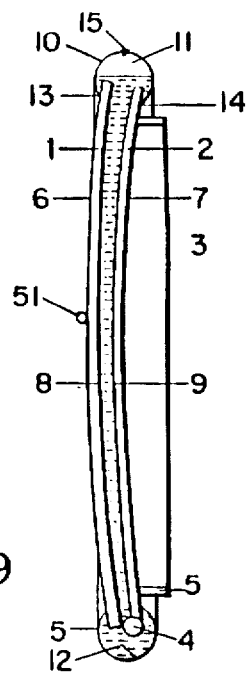

FIG. 9 Lens Unit for negative focal power with lens open.

Figure 10:
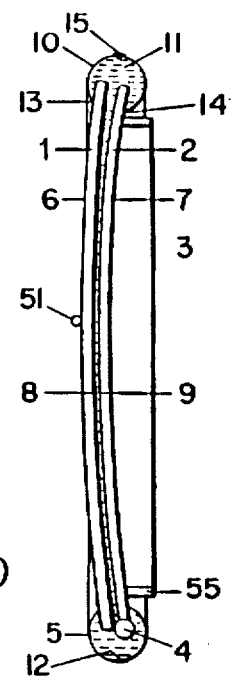

FIG. 10 shows Lens Unit of FIG. 9 closed with no negative focal power.

Figure 11:
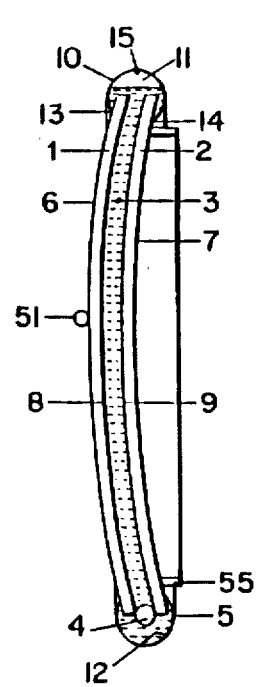

FIG. 11 Lens Unit closed supplying negative focal power.

Figure 12:
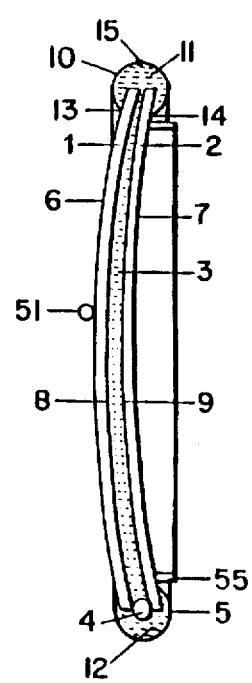

FIG. 12 shows Lens Unit of FIG. 11 open with no negative focal power.

Figure 13:
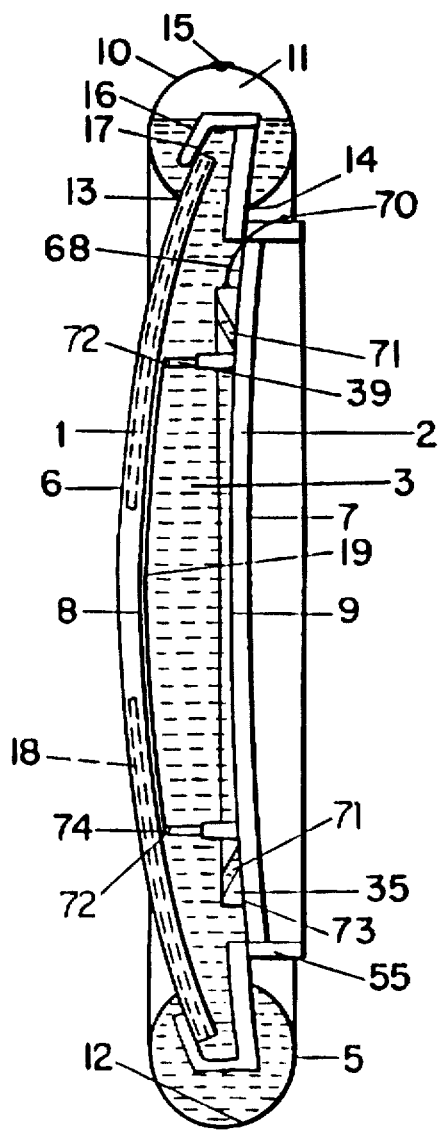

FIG. 13 shows a Lens Unit open with an internal Proportional Solenoid that has a hollow bore. This arrangement can supply both positive and negative focal power determined by function of Solenoid and by reversing the position of the lenses one of which is flexible.

Figure 14:
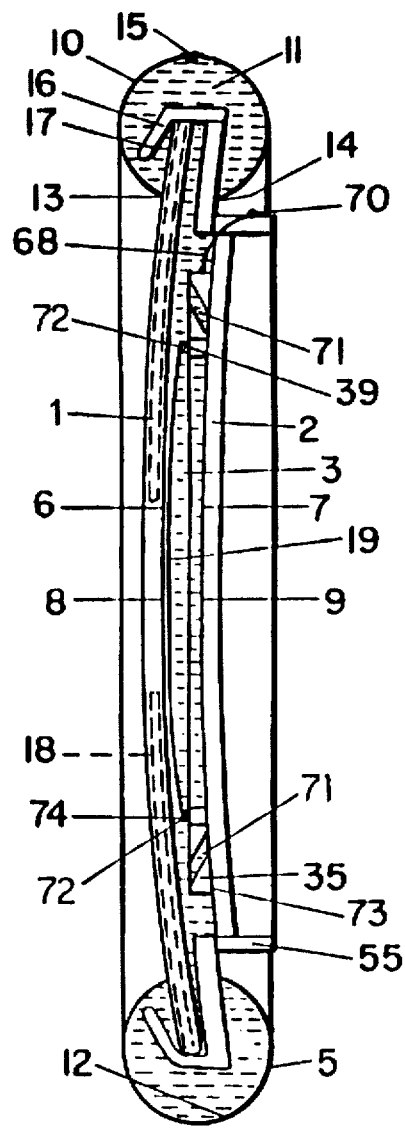

FIG. 14 shows Lens Unit of FIG. 13 closed supplying no focal power.

Figure 15:
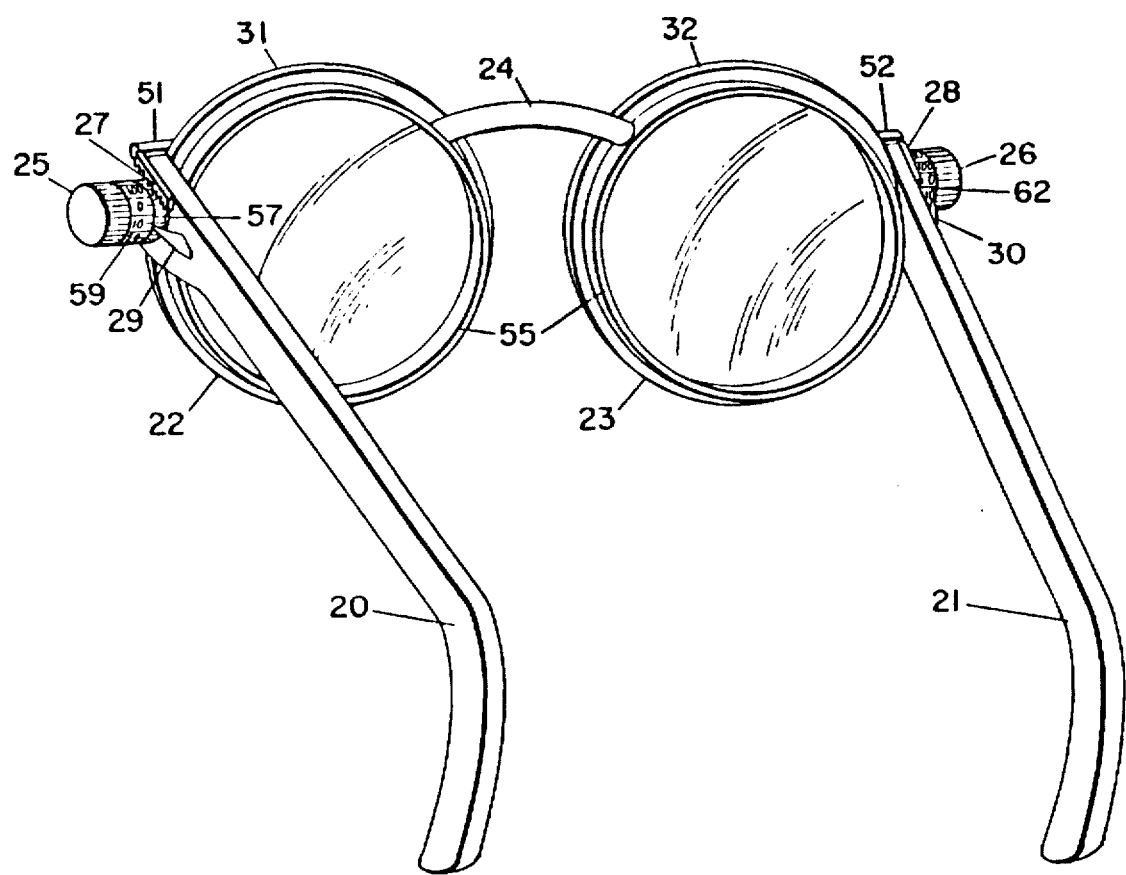

FIG. 15 shows an eyeglass frame 24 used for eye measurement prescription with manual adjustments for Lens Units 31 and 32 in frame 24. Adjustments are made by turning knobs 25 and 26 causing gear racks 27 and 28 to adjust Lens Units 31 and 32, respectively. Each adjustment is independent of each other.

Figure 16:
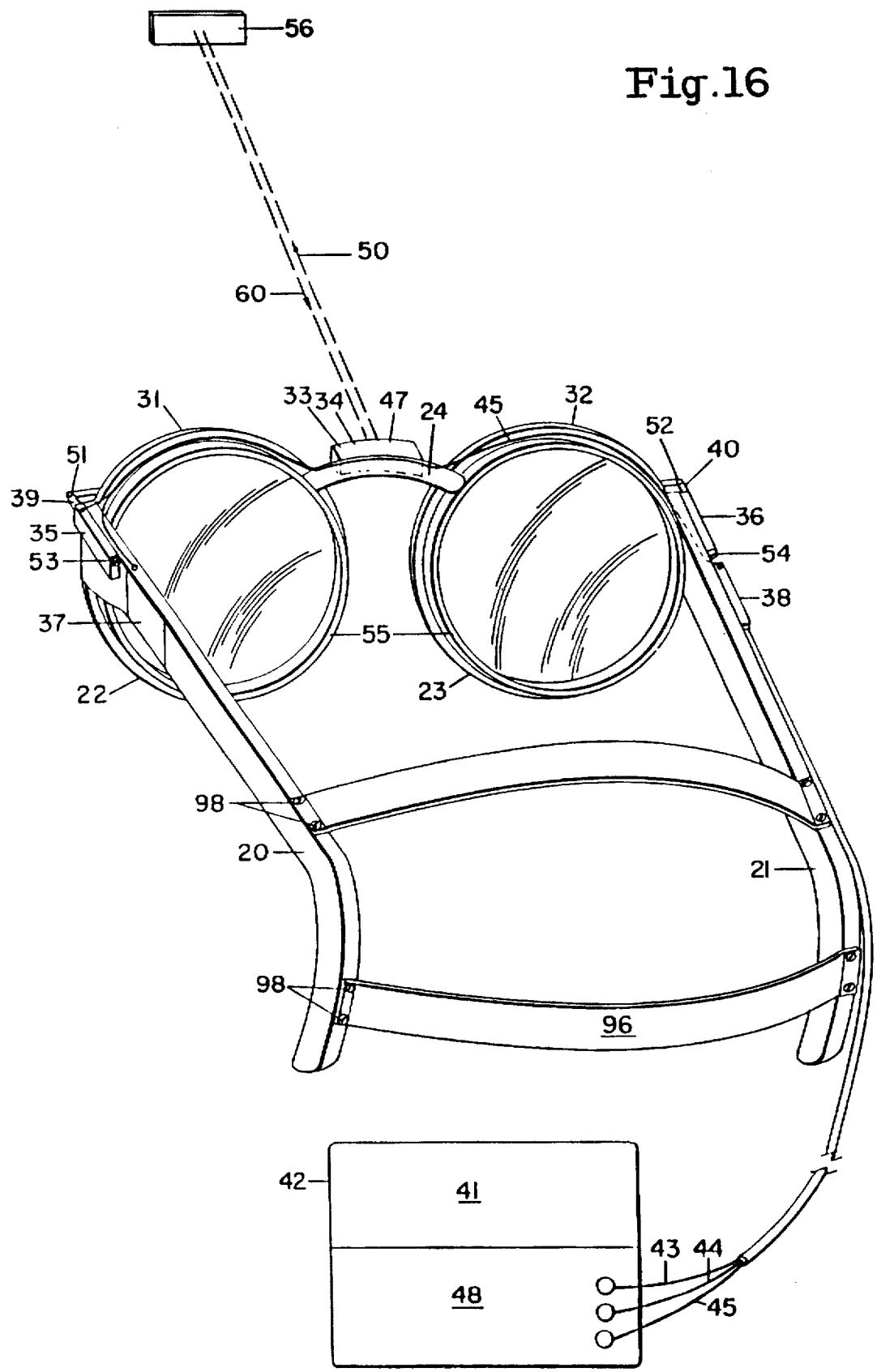

FIG. 16 shows automatic fast focusing eyeglasses, with the Lens Units 31 and 32 in frame 24. The Lens Units are automatically adjusted by Proportional Solenoids 35 and 36, respectively. Radar sending and receiving unit 33 with Monastatic antenna 47 facing straight out is mounted on top center in front of eyeglass frame 24 to supply sending signal 50 for distance, receiving signal 60 from object 56 is then fed into Micro Chip circuits, then into Electronic Converter 48 through harness 45. Electronic Converter 48 then supplies controlling current signal to power supply 37 or power supplies 37 and 38 through harnesses 43 and 44 if two power supplies are used for some special applications.

Figure 17:
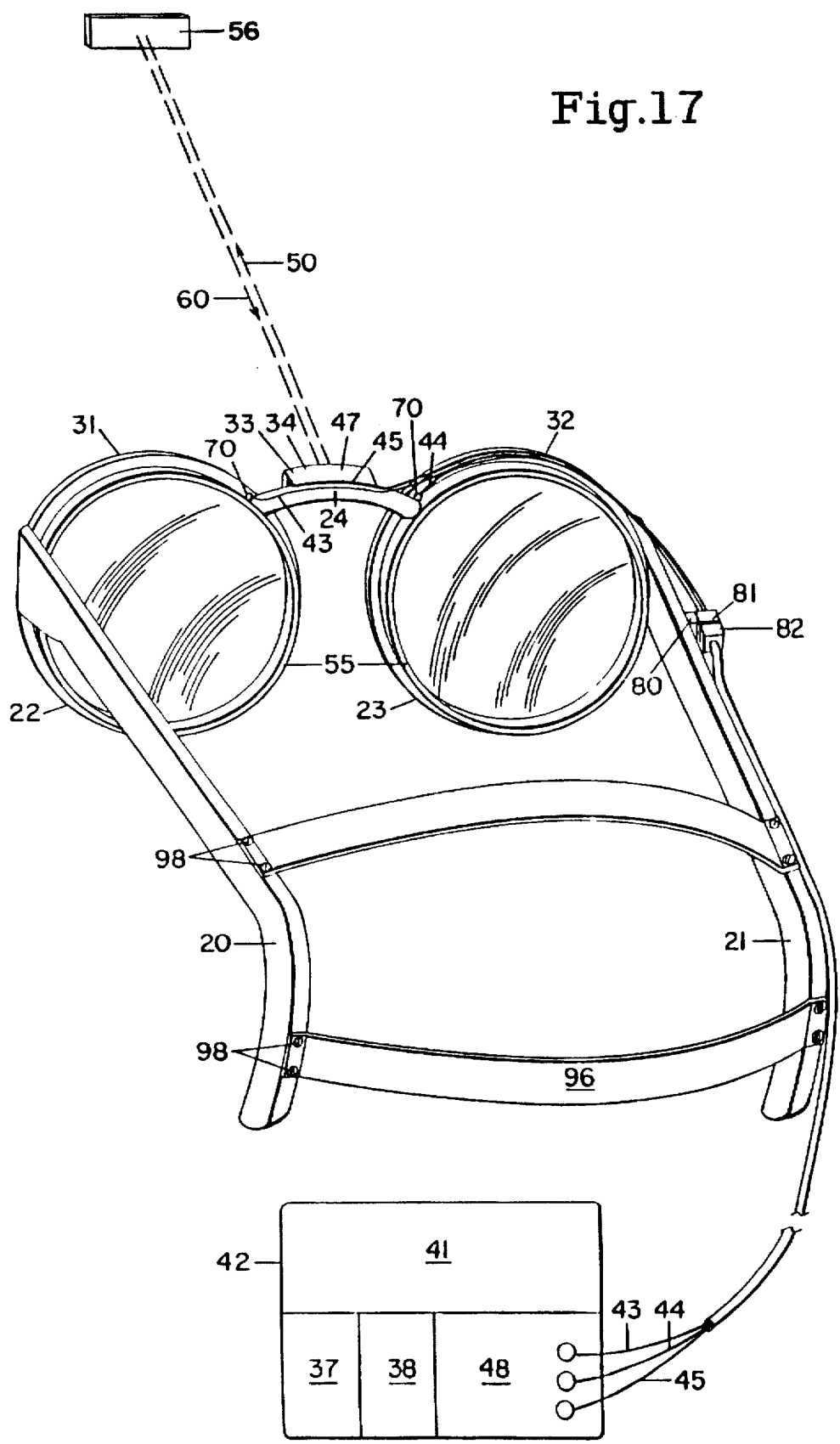

FIG. 17 shows automatic fast focusing eyeglasses, with the Lens Units 31 and 32 in frame 24. The Lens Units are automatically adjusted by Hollow Proportional Solenoids 35 and 36, respectively. Radar sending and receiving unit 33 facing straight out is mounted on top center in front of eyeglass frame 24.

FIG. 18 is a Vari-Lens™ Phoropter showing the adjustment knobs and digital readout display for the right and left eyes respectively.

FIG. 19 is a lens unit used in the Vari-Lens™ Phoropter of FIG. 18 in more detail while providing Positive focal power.

FIG. 20 is a lens used in the Vari-Lens™ Phoropter of FIG. 18 in more detail while providing Negative focal power.

FIG. 21 is the gears and racks connected to supply the constant ratios for eye measurement as used in the Vari-Lens™ Phoropter of FIG. 18 with an encoder coupled to the rear drive gear rack shaft.

Figure 22:
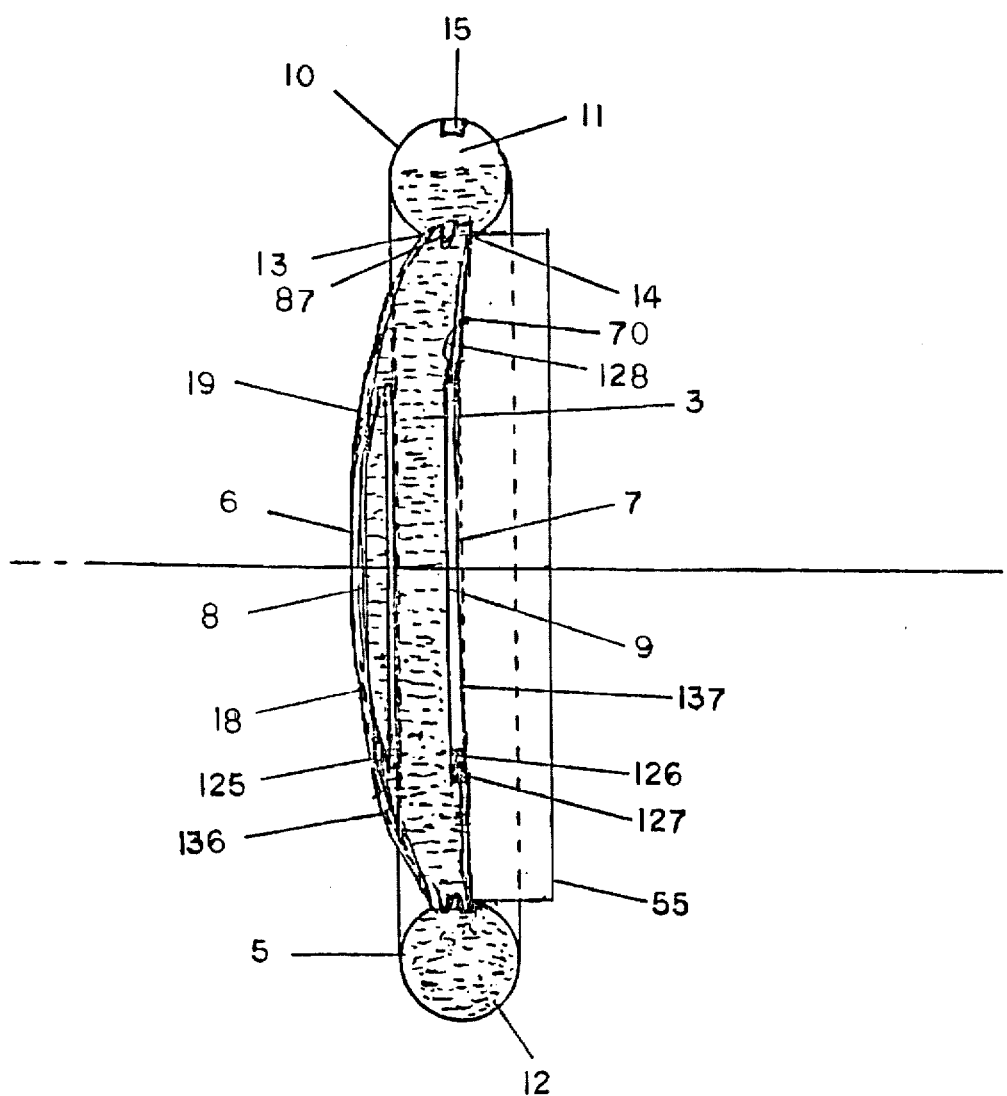

FIG. 22 is the automatic fast focusing unit with positive focal power.

Figure 23:
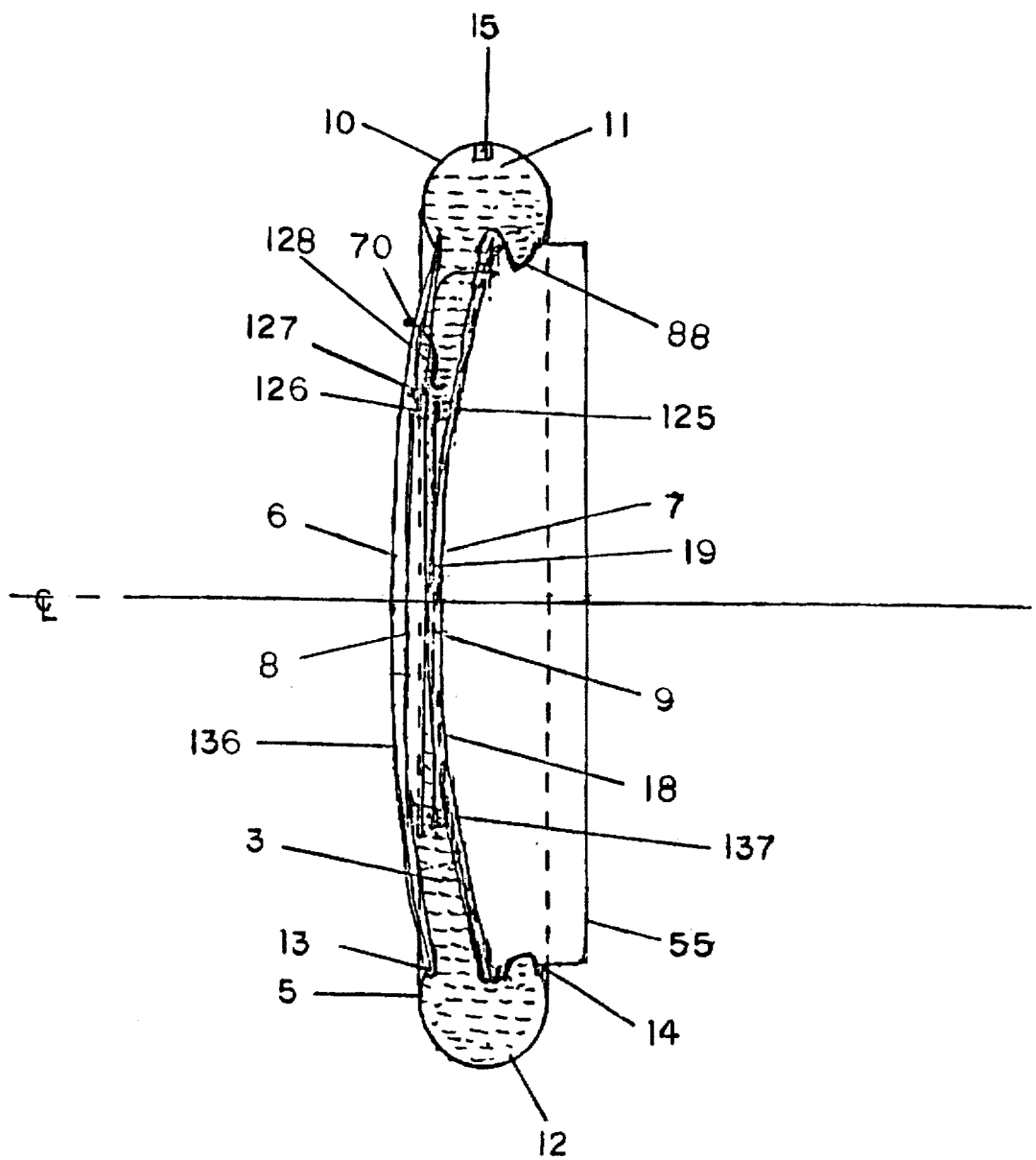

FIG. 23 is the automatic fast focusing lens unit with negative focal power.

Figure 24:
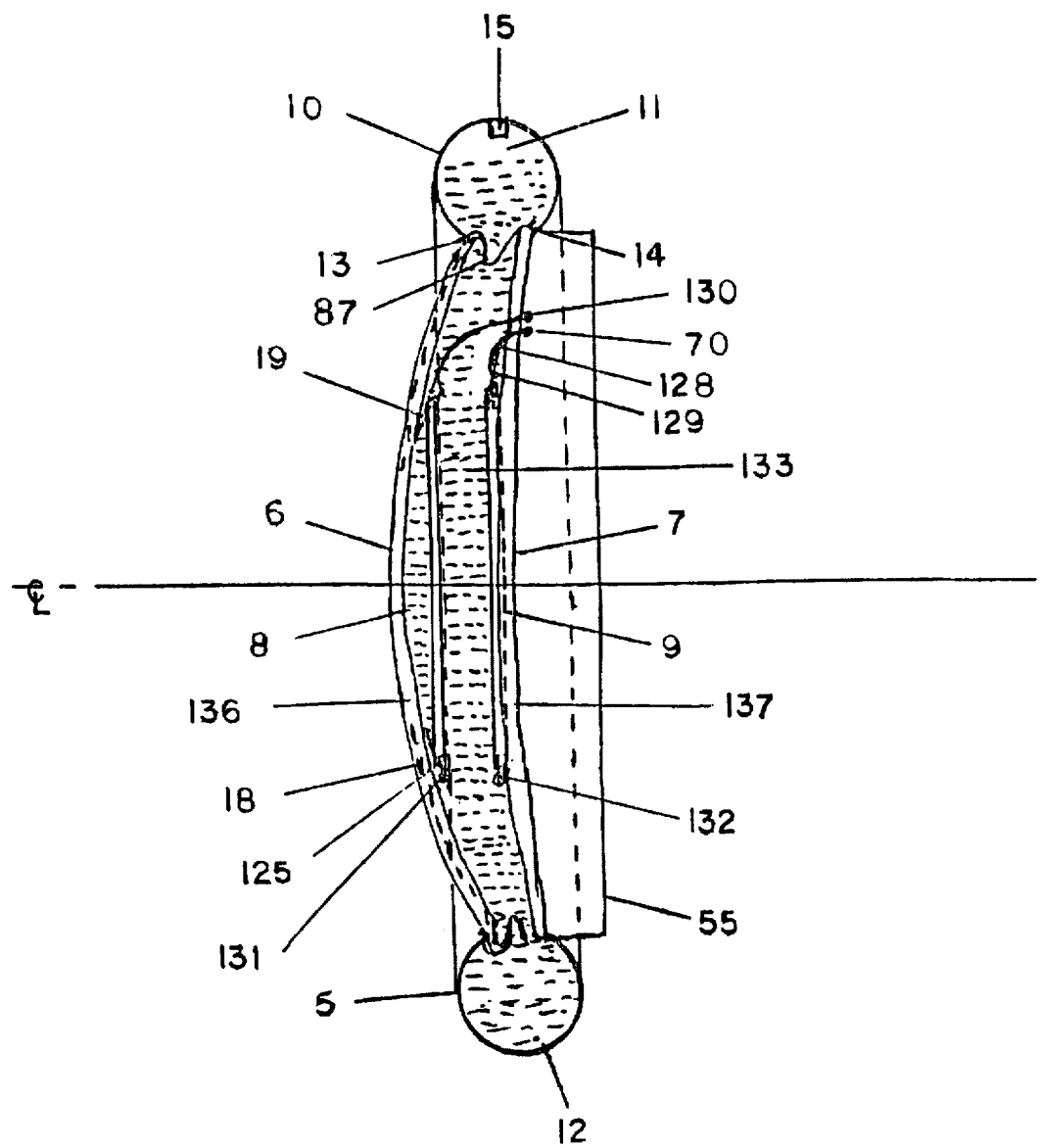

FIG. 24 is the automatic fast focusing lens unit using a clear magnetic oil to move the forward lens outward for positive focal power or the rearward lens forward for negative focal power.

Figure 25:
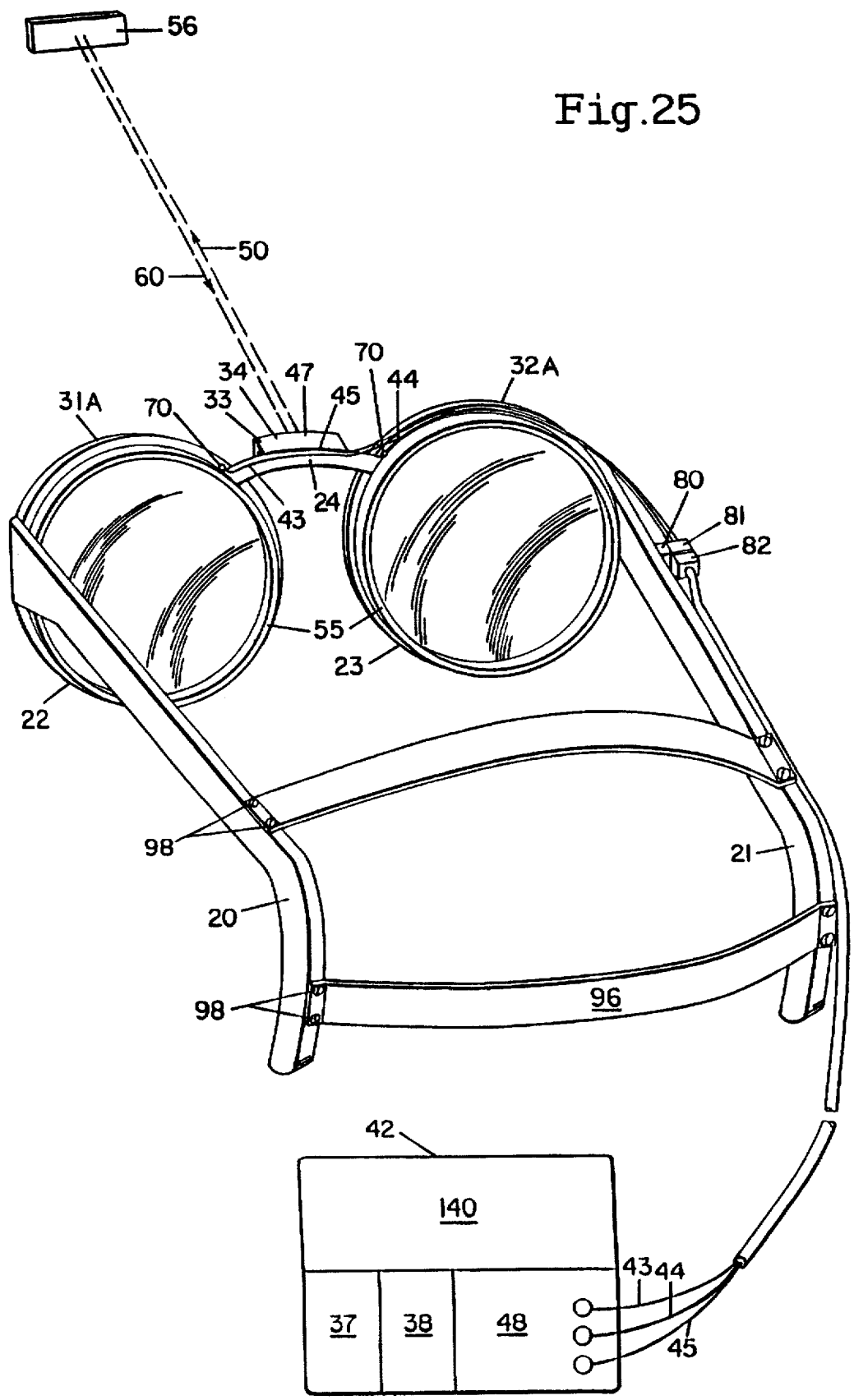

FIG. 25 shows an eyeglass assembly which can hold lens units of FIGS. 22, 23 and 24 for typical use.

DESCRIPTION OF EMBODIMENT

This invention is designed to supply variable positive focal power for farsightedness and variable negative focal power for nearsightedness. The invention is also designed to replace bifocals, trifocals, etc., with its variable focal power varying proportionally to the distance of objects as they are viewed by the individual wearing a pair of the auto focusing eyeglasses automatically. The difference in radii of the inner and outer Lens Unit surfaces determine the amount of focal power.

This invention uses two clear lenses with a variable mass in between, that are covered around on periphery (sides) with a molded hollowed out thin-walled elastomeric C-shaped Ring. The periphery of the lenses can be round, octagonal, etc. The C-shaped Ring also serves as a reservoir for fluid 3. The C-shaped Ring can also be made of clear or opaque molded Surlyn or similar flexible thin material exhibiting high strength for its very thin thickness of material, with good flexibility. The lenses can be made of CR-39 plastic lens material or other rigid thin plastic or glass materials. The lenses can be compression or injection molded.

The variable mass can be any of a variety of clear liquids having the same index of refraction equaling the CR-39, or approximately the same index or refraction equaling the plastic lenses either rigid or flexible.

One liquid in particular is Polydimethylsiloxane Polymer (Silicone Oil) an industrial lubricant. The optical properties are excellent, with an index of refraction of approximately 1.4. The liquid will not discolor, and is not effected by sunlight. It has a flat slope as temperature vs. viscosity. This flat slope refers to the change in viscosity as temperature changes. It allows for an even flow of liquid from low to high temperatures that are found in everyday environments and weather conditions. The liquid will not freeze or evaporate under these conditions.

A DC-200/five Centistokes grade will provide excellent operation. Lower grade numbers below five in Centistokes are combustible and can be used but the flashpoint is much lower, which may be acceptable in certain applications. The five grade has a 272° F. flashpoint which is safe to use as it is much higher than the temperature of boiling water. This Silicone Oil is manufactured by Dow Corning at Midland, Mich.

Current plastic lenses of Acrylic, Polycarbonate and Polystyrene are approximately 1.5 at ("D) for index of refraction.

The viscosity of the clear liquid should preferably be light. Medium can be used but will take longer to adjust focal power. It should not freeze at low temperatures or boil away at high temperatures or evaporate. The liquid should be of good quality, free from impurities and bubbles, etc.

The C-shaped Ring reservoir containing the fluid for the lenses is preferably mounted eccentrically to the lenses, for FIGS. 1–6, and 9–12 with its center line above the center line of the lenses. The C-shaped Ring reservoir containing the fluid is securely mounted to the lenses so that there is no leakage. The C-shaped Ring reservoir covers the lenses on the outside of the lens; it can also be mounted in-between the lenses above or below the hinge pivot or sliding joint 16 as well. A coloring agent can be added to the variable mass liquid for prescription sunglasses. Each Lens Unit except FIGS. 13 and 14 consists of two lenses mounted on a frictionless pivot (hinge). This pivot between the lenses for FIGS. 1–12 establishes a starting point creating a zero mark for its focal power.

In reference to FIGS. 13 and 14 the starting point and the zero mark is from the Solenoid in its closed position with the flexible lens stabilizer ring 19 connected to the plunger end 74 in its most inward position as shown in FIG. 14 and with the flexible lens being in its most inward position under the sliding joints 16. This is the same for the Solenoids in closed position as shown in FIGS. 1–12 as well. This hinge can be made of jeweled bearings and attached to the lenses by integral molding, or other industrial processes. The C-shaped Ring reservoir surrounds the lenses with the hinge pivot.

As the forward lens spreads apart from the rear stationary lens, the liquid fills the void by displacement of the fluid from the reservoir by capillary attraction of fluid in between the lenses with gravity and a small amount of Helium gas pressure added to the reservoir after filling the liquid, to speed up the movement of the fluid. As Lens 1 was spreading apart from Lens 2 an infinitely varying difference in radii were created between Lenses 1 and 2. This results in a variable positive focal power for FIGS. 1, 3 and 7 to replace bifocals, trifocals, etc.

Also, the liquid should have good capillary attraction to the lenses. As the forward lens 1 spreads apart from the rear stationary lens 2 in FIGS. 1 to 14 a variable focal point lens is established giving a variable focal power for FIGS. 1, 3 and 7. When using the same index of refraction for lenses and intermediate liquid, the shape of the lens unit with its differences in radii will determine the focal power.

FIG. 1 shows this arrangement. FIG. 2 shows the lenses closed with a very thin amount of liquid in between lenses 1 and 2. FIG. 6 shows focal power when closed by slight shape change of lens 2 and by different location in relationship to hinge pivot 4. FIG. 5 shows the Lens Unit of FIG. 6 open with no focal power by arrangement of the Lenses with the liquid 3 in-between creating parallel radii. This is an alternative arrangement so that the proportional solenoids can be used in reverse operation of design if desired. FIG. 3 shows focal power using a higher index of refraction for fluid 3 than the outer lenses 1 and 2. When lenses 1 and 2 are closed, there is a very thin amount of fluid 3 in between and the radii are parallel resulting in no focal power. The focal power in FIG. 3 is achieved by difference in radii of surfaces 8 and 9 inner surfaces of lenses 1 and 2.

Shown in FIG. 7 is an alternate Lens Unit supplying positive focal power that can be constructed with Lens 1 being of flexible clear material having internal channels on surface 8 radiating out from center to provide uniform change in radii as lens 1 moves in and out, with one end of Lens 1 fastened to hinge pivot 4, and with opposite end fastened under a sliding joint 16 located 180° from hinge 4 to Lens 2. The channels provide for shrinkage of surface area 8 on Lens 1 as the lens bends, without causing crumpling or uneven movement of lens from center line axis as shown in FIGS. 7, 8, 13 and 14. The sliding joint 16 is mounted inside or outside of C-Ring reservoir 5 and is fastened to Lens 2.

The Solenoid pivots 51 and 52 are connected near to the center line of Lens 1 on the inner bore of C-Ring 5 surface 6 at any point adjacent to 13 excluding the quadrant containing hinge 4, and extending out left or right respectively to form Lens Units 31 and 32 respectively with Solenoid plunger extensions 39 and 40 connected respectively to create difference in radii as Solenoids 35 and 36 expand respectively. Solenoid pivots 51 and 52 can be made of clear high strength material. FIG. 8 shows the Lens Unit of FIG. 7 closed supplying no focal power. FIG. 9 shows negative focal power using a higher index of refraction for fluid 3 than lenses 1 and 2.

Difference in radii is between surfaces 8 and 9, (can also be between surfaces 6 and 7 of lenses 1 and 2) with center portion being thinner than the outer ends. FIG. 10 shows the Lens Unit of FIG. 9 closed supplying no focal power, due to parallel radii of lenses 1 and 2 for surfaces 6 and 7, or 8 and 9. FIG. 11 shows negative focal power when closed by creating a smaller radius on inner lens 2 outer surface 7, with larger radius on surface 6 of lens 1. FIG. 12 shows lens 1 open creating no focal power with parallel radii. Nos. 6 and 7 are outer lens surfaces for FIGS. 1–14. Nos. 8 and 9 are inner surfaces of lenses in FIGS. 1–14. No. 3 is the clear intermediate liquid in FIGS. 1–14. Nos. 1 and 2 are the lenses for FIGS. 1–14. No. 5 is the C-shaped Ring reservoir containing fluid for FIGS. 1–14. No. 4 is the hinge pivot for the pivoting of the forward lens No. 1 for FIGS. 1–14.

Nos. 13 and 14 are contacting surfaces for connection of C-shaped reservoir Ring to lens surfaces 6 and 7 for FIGS. 1–14. Leakproof connection is made by various industrial processes. After Lens Units are assembled, they are filled with clear liquid 3, then an amount of Helium gas is added under a small pressure sufficient enough to expel the air in C-Ring reservoir 5 and help the transfer of fluid 3 from C-Ring reservoir 5 to the void between inner surfaces 8 and 9 of Lenses 1 and 2 and vice versa as the Lens Units are varied.

Next C-Ring reservoir 5 is capped off with plug 15 in C-Ring reservoir 5 for FIGS. 1–14. In FIGS. 1–14 there is always a small amount of liquid between the lenses. This supplies a starting reference load so that the Proportional Solenoids (FIG. 16) operate uniformly proportionately and with precision. The liquid also acts as a cushion between the lenses.

Shown in FIGS. 1–14 a flange 55 is integrally molded to the surface 7 of Lens 2 inside of C-Ring reservoir 5 bore adjacent to connection 14 for Lens Units in FIGS. 1–14. The flanges 55 and 55 extending rearward into frame housings 22 and 23 respectively. These Lens Units 31 and 32 are now part of the eyeglass frame 24 in FIGS. 15 and 16. The reservoirs 5 and 5 on Lens Units 31 and 32 have clearance between their rearward outer surfaces 10 and 10 and eyeglass frame housings 22 and 23.

The flanges 55 and 55 of Lens Units 31 and 32 can be fastened by Epoxy to the eyeglass frame housings 22 and 23. FIG. 13 shows a Lens Unit open supplying positive focal power by having a specially designed Hollow Proportional Solenoid 35 or 36 mounted in between lenses 1 and 2, and is centered and fastened to stabilizer ring 19 of lens 1 and inner surface 9 of lens 2 by various industrial processes. The construction described for FIG. 13 is for the Lens Units 31 and 32 respectively that are used in eyeglass frame 24 of FIG. 17. The forward lens 1 is mounted under sliding joints 16 located around the periphery of lens 2. The sliding joints 16 are fastened to the stationery lens 2 by various industrial processes. It is free to move outwardly and evenly without distortion of the change in radii, created as the lens moves outwardly as shown in FIG. 13. The radius is equal around the entire circumference of surface 6 of lens 1. Lens 1 is centered by the C-Ring reservoir 5, that is mounted concentrically to lenses 1 and 2 as shown in FIGS. 7, 8, 13 and 14, and additionally for FIGS. 13 and 14 by the Hollow Proportional Solenoids 35 and 36 respectively to their axes of centerline in operation, as they expand and retract.

The force to move the forward lens 1 outwardly comes from the Hollow Proportional Solenoids 35 and 36 mounted in between lenses 1 and 2 for Lens Units 31 and 32 respectively. Power comes from connection 70, where power from the power supply connects to. The movement of Lens 1 moves outwardly and evenly in the same centerline axis of Solenoids 35 and 36 as shown in FIG. 13. A clear lens radius stabilizer ring 19 is fastened to the center of Lens surface 8 so that when expansion from Solenoid plungers 39 and 40 respectively pushes outwardly for Lens Units 31 and 32 respectively, there is uniform distribution of force. Solenoid plungers 39 and 40 are connected respectively to radius stabilizer rings 19 and 19 respectively for Lens Units 31 and 32. The Proportional Solenoid of this Lens Unit in FIGS. 13 and 14 is hollow in the center so that vision can be seen through for this application without any interference. These Solenoids 35 and 36 are specially made for this purpose. There are fluid ports 71 and 72 located at the specially made Proportional Solenoids rear ends 73 and 73, and plunger ends 74 and 74 of plungers 39 and 40 in connection areas to the stabilizer rings 19 and 19 to surfaces 9 and 9 respectively, to allow fluid to flow throughout the entire Lens Unit unobstructed with these hollow Solenoids in the Lens Units.

The rear ends 73 and 73 of these Proportional Solenoids 35 and 36 are fastened to surfaces 9 and 9 with plungers 39 and 40 connected respectively to stabilizer rings 19 and 19 respectively of Lens Units 31 and 32 respectively. Retraction of lenses is by Solenoid return of plungers and by slight resilience of flexible lens material. The Lens Units shown in FIGS. 13 and 14 are for positive focal power. FIG. 14 shows the positive focal power Lens Unit of FIG. 13 closed supplying no focal power. For negative focal power FIG. 13 can be used by reversing the operation of the Hollow Proportional Solenoids 35 and 36 to pull in, instead of pushing out, and by reverse mounting of the sliding joints 16 fastened to flange 55, with lens 1 fastened to flange extension in C-Ring reservoir 5. Now along with the flexible lens being mounted on the rear designated as lens 2 instead of the outward position designated as lens 1 of the Lens Unit in FIG. 13, the lens 2 will be moved toward front on center line axis by the Hollow Proportional Solenoids 35 and 36 respectively, decreasing radius on surface 7 with radius on surface 6 now being larger with respect to surface 7. This will supply negative focal power for the FIG. 13 closed and no negative focal power for FIG. 13 when open.

FIG. 15 is for eye measurement and has adjustment knobs 25 and 26 which extend gear rack extensions 27 and 28 to adjust Lens Units 31 and 32 by turning knobs 25 and 26 with dials 59 and 62 attached respectively. Corresponding pointers 29 and 30 give readout on knob dial scales 59 and 62, e.g., 0–100, for the eye focal power correction in Diopters etc. Nos. 27 and 28 are the gear rack extensions connected to 51 and 52 that are fastened to lenses 1 and 2 of the Lens Units 31 and 32 for the lenses shown in FIGS. 1–14. Nos. 20 and 21 go over the ears for wearing by individuals. Nos. 22 and 23 are the frame housings for the flanges 55 and 55 of the Lens Units. In FIG. 16, nos. 35 and 36 are the Proportional Solenoids that are mounted into the ear extensions 20 and 21 of frame 24 with power supplies 37 and 38 feeding power to them (current controlled power supplies, etc.), that can also be mounted into the ear extensions 20 and 21 of frame 24 to achieve a more compact product. No. 96 is an optional headband to relieve any excess pressure on bridge of the individual's nose due to the weight of radar unit 33. The headband is detachable if so desired, from fittings 98. Nos. 39 and 40 are the plunger extensions to 51 and 52 to the lenses 1 for FIGS. 1–12.

In assembly Solenoid pivots 51 and 52 are connected to outer top left and top right surfaces 6 and 6 of Lenses 1 and 1 respectively to form Lense Units 31 and 32 respectively. No. 33 is the Radar sending unit with 50 being the beam sent out and beam 60 returning from object 56 to measure the distance. FIG. 17 uses the same electrical circuitry and the same eyeglass frame 24 used in FIG. 16, with basically the same construction except that the Lens Unit previously described for FIG. 13 are used for Lens Units 31 and 32 respectively, and the side mounted Proportional Solenoids 35 and 36 are now mounted in between the lenses and are now called Hollow Proportional Solenoids 35 and 36 respectively, for FIG. 17. The power supplies 37 and 38 are missing from frame 24 and the two power supplies 37 and 38 are mounted in case 42 to supply power to the Hollow Proportional Solenoids 35 and 36, for a more compact eyeglass product. No. 80 is the mounting base mounted to either 20 or 21 of eyeglass frame 24 for female receptacle 81 that connects to plug 82 used to separate the wire harnesses 43, 44 and 45.

The Radar sending and Radar receiving unit 33 is combined together for use in this invention. The sending and receiving Monastatic antenna 47 is covered with a protective cover called a Radome 34. There are various bands of frequency operation in Giga Hertz. An RF amplifier with Micro Chip circuitry is connected to increase the radio frequency output signal 50 for distant objects. This amplifier is coupled to Radar unit 33 on eyeglass frame 24 to comprise one unit 33. The signal 50 sent out hits the object 56 and return signal 60 is received by the receiver, then fed into the Analog Micro Chip circuitry that down converts high RF to low RF and then to Sampler Converter Micro Chip circuitry. The Sampler converts the radio frequency to voltage. Then the voltage is fed into a Closed Loop Circuit using Micro Chip circuitry with Range Gating to give an accurate measure of distance when the transmitted signal 50 hits an object 56 at various angles along with a straight ahead angle of 90°. The resulting output voltage is proportional to the distance that has been measured. The Radar unit 33 is powered by current from battery 41 in case 42 through harness 45 which also carries the output voltage to an Electronic Converter 48. The Electronic Converter 48 then sends a controlling signal voltage to the Current controlled power supply 37.

With the output current of the power supply 37 varying in proportion to the distance which has been measured by the Radar unit 33, this controlled output from 37 is connected to Proportional Solenoids 35 and 36 and now varies the Proportional Solenoids 35 and 36 equally and proportionally respectively. This is from a starting point with plungers 39 and 40 of Solenoids 35 and 36 either retracted or extended. With the output plungers 39 and 40 connected to the pivots 51 and 52 the Lenses 1 and 1 of Lens Units 31 and 32 will vary equally and proportionally as well as giving the correct variable focal power for the varying distances. The results in automatic focusing for the eyeglasses.

No. 42 is the case for battery and Converter, 48, wire harness 45 for sending unit 33. Power supply 37 to wire harness 43. Harness 43 also supplies power to the Proportional Solenoids 35 and 36. Power supply 38 to wire harness 44. Harness 44 can also supply power separately to Solenoid 36 if used independently of each other for special applications. Two power supplies are shown, but one is sufficient for normal use. An Electronic Converter 48 is mounted in case 42 that also houses the battery 41.

The signal comes from Radar sending and receiving Unit 33 and then is sent to an Electronic Converter 48 inside case 42, and then the output controls the power supply 37 (can supply both Proportional Solenoids) to supply current to both Proportional Solenoids 35 and 36. Power supplies can be either a Current controlled power supply or a battery back power supply. The Current controlled power supply maintains voltage and varies the Current enabling the Proportional Solenoids to move in precise amounts of travel. Battery 41 is a portable battery in case 42 supplying power for the Radar sending and receiving unit 33, the Electronic Converter 48 and the Current controlled power supply, which in turn powers the Proportional Solenoids 35 and 36.

The lenses in FIGS. 1–14 are coated with an anti-fog compound called "Vacuum Film Deposition" to stop fogging up of the outer surfaces 6 and 7 of the lenses 1 and 2, and to give better usefulness for all environments. The lenses can also be coated with other coatings to improve abrasion resistance and minimize reflection and glare if desired without affecting focal power. In normal operation the Lens Units shown in FIGS. 1–14 are mounted in frame housing 22 for Lens Unit 31 and frame housing 23 for Lens Unit 32 respectively of eyeglass frame 24 as shown in FIGS.

16 and 17, with the Lens Units designated as 31 and 32. The Lens Units shown in FIGS. 1–14 show different operating characteristics where the Proportional Solenoids 35 and 36 can be adapted for the operating features of the Lens Units for different design requirements with the eyeglass frames 24 in FIGS. 16 and 17. When the eyeglass frame is worn in FIG. 15, the individual's eyes can be checked giving a very accurate reading showing either the positive or negative amount of Focal Power by an optometrist as the patient adjusts the control knobs 25 and 26 with a gear 57 and 57 on the control knob shafts 58 and 58 moving gear rack extensions 27 and 28 while pointers 29 and 30 show the reading on the knob dial scales 59 and 62. The optometrist will select the charts and distance and the patient adjusts the knobs 25 and 26 for the best focus. The optometrist can adjust the automatic fast focusing eyeglass Lens Units 31 and 32 in frame housings 22 and 23 of frame 24 in FIG. 16 for the patient. Now with the individual wearing the automatic focusing eyeglasses shown in FIGS. 16 and 17, all the individual has to do is just look at an object straight ahead near or far and the Lens Units 31 and 32 in frame housings 22 and 23 of frame 24 will focus together so the object can be seen clearly and distinctly.

When the individual looks directly straight ahead at an object or road ahead, a beam 50 is sent out from the Radar sending and receiving unit 33 mounted on eyeglass frame 24 in outer top center front after which a beam 60 is sent back from object 56 generating a signal value in relationship to the distance proportionally. The frequency of the Radar Unit 33 is different from other standard Radar in use e.g., navigation, police etc. The signal is fed into Electronic Converter 48 which in turn controls the Current controlled power supply 37 (power from the battery 41 is fed into power supply 37) or similar power supply, thereby supplying a specific amount current to the Proportional Solenoids 35 and 36 supplying equal amounts of travel for plunger stroke shafts 39 and 40, each of which is connected to Lens Units 31 and 32, respectively. For FIG. 16 plungers 39 and 40 are attached on pivot joints 51 and 52 to the forward movable lens. For FIG. 16 the opposite ends of the Proportional Solenoids 35 and 36 are attached on pivots 53 and 54 to the frame.

This amount of plunger travel from the Proportional Solenoids 35 and 36 will now automatically focus the Lens Units 31 and 32 for the object aimed at straight ahead by the eyeglass frame 24.

Case 42 holds a battery 41 which supplies the power for the components, 33, 35, 36, 37, 38, and 48 and any other electrical parts associated with components 33, 35, 36, 37, 38 and 48. The distance of an object sighted is directly related to the focal power required of the Lens Units 31 and 32 for the individual wearing the auto focusing eyeglasses. The auto focusing eyeglasses described in FIGS. 16 and 17 once adjusted for a given value of maximum focal power will be interchangeable with another patient requiring equal eyeglass focal power prescription. This is standardization of product. Case 42 can be carried in a pocket or in a pouch attached to a belt, etc. Wiring harness 43, 44, and 45 can be worn under a coat, etc. to achieve a more compact product battery 41 could be mounted on 20 of eyeglass frame 24 with Electronic Converter 48 mounted on 21 of eyeglass 24 using same wiring harnesses 43, 44 and 45 respectively, to give a completely portable auto focusing eyeglass product less case 42.

Focal distance measurement is accomplished preferably by using a combined Radar-sending and receiving device. Other types of units, e.g., microwave, are also possible.

The present invention Vari-Lens™ Phoropter units shown in FIG. 18 operates through the use of gear racks 109 and 110 attached respectively to the outside of each lens by extension arms 116 and 117 connected to the outer stablizer rings 89 and 91 respectively. The two gear racks 109 and 110 are for each lens unit shown in FIGS. 19 and 20. They are driven from the adjustment knob shafts 118 and 118 with adjustment knobs 25 and 26 connected to each respectively, moving the forward lens element 136 and moving the rear lens element 137 through a gear reduction of gears 111 and 112 with the drive gear 111 moving the forward gear rack 109 and moving the rearward gear rack 110 while being coupled to an encoder 100. This establishes a constant ratio change in radius between, for the curvature of the forward lens surface 96 of element 136 to the rearward outer lens surface element 101 of element 137. This will establish positive variable focal power.

When the adjustment knobs 25 and 26 are turned the oposite direction counterclockwise to the zero center, when at this point the forward and rearward lens elements 136 and 137 are parallel to each other with zero focal power as the adjustment knob 25 and 26 are turned further counterclockwise (backwards) the forward lens element 136 is now moving inward as the rearward lens element 137 is moving outward towards the patient's eye. In this relationship negative focal power is created and increases as the knobs 25 and 26 are further turned back counterclockwise, causing the forward gear rack to move a greater distance thus moving the forward lens element 136 further inward to obtain a sharper radius than the radius on the rearward lens element 137 outer surface 101.

The encoder 100 is coupled to the drive shaft which moves the rearward lens element gear rack 110. The encoder 100 is divided into 1,000 segments of 1 complete revolution. For this purpose to use powers of 10 to be displayed on an electronic readout Positive to Negative Totalizers 83 and 84. This display is a digital LED type showing numbers converted to diopters either Positive or Negative depending on type of focal power. The encoder 100 and the Positive to Negative Totalizer display units 83 and 84 are battery powered, low-current drain which make them ideal for portable use.

These units are made by Eaton Corporation located in Watertown, Wisconsin and are precisely and ruggedly designed for precision use measurement. When the encoder is in use it provides a DC square wave output voltage when the shaft is turned, as the shaft turn amount increases so does the output and this output is fed into the Positive to Negative Totallizer measuring the amount of diopters for each direction, e.g., clockwise to increase Positive amount, counterclockwise to increase Negative amount with a zero center for a starting of zero focal power with lens outer surfaces 96 and 101 of lens elements 136 and 137 being parallel to each other. The phoropter is used in the following manner, e.g., the patient looks through the unit and focuses on an eye chart, etc., as the eye doctor supervises and when the patient focuses in to the clearest view the amount of diopters for the focal power will be read out on the display LED read-out units. The lens units are held in a frame of the phoropter housing and are connected as shown in FIG. 21. The gear racks Nos. 109 and 110 are mounted on slide tracks Nos. 134 and Nos. 135 which are part of the phoropter assembly No. 80 internally to allow linear movement forward to rearward only. The encoders Nos. 100 and 100 are mounted on opposite sides, left and right for the left and right eyes respectively.

The control knobs 25 and 26 are mounted on the right and left sides of the outer phoropter housing 80. The parts of the phoropter unit 80 are assembled and connected through standard and industrial methods and practices as those generally used in the field for standard optometry phoropter manufacture. FIGS. 19 and 20 show the lens units that are used in the phoropter 80 of FIG. 18. FIG. 19 shows the lens unit in positive focal power position. The lens unit has four stabilizer rings 89 and 90, 101 and 102 respectively for each side. The principles are basically the same as those used in the previous patent to achieve positive focal power by mainly creating a sharper radius on the forward and outer lens surface 96 as that compared to the rearward outer lens surface 101. Magnet Sales & Manufacturing Company of Culver City, Calif. is a supplier of magnets in flexible binder material. The lens material for both the flexible lens elements and the stationary lens elements can be made of a clear optical grade of Polyethylene Terephthalate, one particular grade is Ektar GN0005 Co Polyester with an index of refraction of approximately 1.56. Another Terephthalate base grade with a chemical name of Cyclohexol Dimethanol and having a different monomer content is Ektar DN004 with similar optical characteristics, but having a better flow of material during the injection molding process.

The index of refraction of the Polyethelene Terephthalate is very close to that of Polycarbonate. The Polyethelene Terephthalate material grade Ektar GN005 Co Polyester is a primary grade that is co-polyester glycol modified with a mold release agent for injection molding. The Ektar GN005 is in the same famility as Kodar PETG Co Polyester 6763 which is also a co-polyester glycol modified Polyethelene Terephthalate. There are aaalso two other grades, Kodapak PET Polyester 7352 and Kodapak PET Co Polyester 9921 that can be used for lens material. These latter two grades are commonly used for clear soda bottle material. Polyethelene Terephthalate is also known as PET. This material has good moisture barrier resistance to retain liquids, gases, etc., and is flexibile at varying temperature. This material is made by Eastman Chemical Company, a division of Eastman Kodak located in Kingsport, Tenn. Another grade of lens material is Polycarbonate such as 121. This material is made by General Electric Company of Pittsfield, Mass. The index of refraction for the optical grade of Polycarbonate is approximately 1.58. These materials can be injection molded and coated as well as stamped from a sheet to include the radial channels and S-shaped circular channel, etc. for all of the lens units in this application as illustrated in FIGS. 18 through 25.

A hard surface compound can be put on the Polycarbonate lens surface to resist scratches, abrasions, etc., by the evaporation coating process. An anti-reflection coating can be applied by the evaporation coating process applied to the surface to increase the percentage of light transmitted through the lens elments to about 95%. The Younger Optical Company of Los Angeles, Calif. is a supplier of this lens material.

The lenses can be assembled to the C-ring reservoir with an Ultra-Violet curing adhesive. This adhesive makes use of Photo Initiators and is comprised of Polyurethane Oligomer Mixtures. The adhesive uses a special Ultra-Violet curing lamp that operates on a frequency of 365 Nanometers with a 60 millisecond/Sq. cm. output. The curing takes place in about 20 seconds. The Ultra-Violet light affects the Photo Initiators at the 365 Nanometer frequency and then curing (hardening) of the adhesive takes place. One such adhesive is No. 139M, a class VI medical grade manufactured by the Dymax Co., located in Torrington, Conn.

FIG. 20 is the same as FIG. 19 except the lens elements 136 and 137 are reversed in position thus establishing negative focal power. A special stabilizer ring 19 is used and attached to the inner surface 9 of lens element 137 to facilitate inward movement.

FIG. 21 shows the general set-up schematically of how the various components are arranged and connected within the phoropter housing 80 internally. The illustration shows how the components will move in position to each other, e.g., the drive pinion 138 is below the forward gear rack 109 while the driven pinion 139 is above the rearward gear rack 110 thus providing movement in the same direction to achieve a constant ratio between the two racks for a corresponding change in radius of the lens outer surfaces 96 and 101 to produce positive focal power or reversal of direction to produce negative focal power. Number 140 is the battery operated power supply that powers the encodes 100 and 100 and the digital totalizer read-out display units 83 and 84 respectively.

FIG. 22 shows a lens unit using a permanent flexible magnet made of Neodymium Iron Boron in a flexible rubber binder 125 exhibiting a North pole to be repelled from the magnetic force of similar North poles from the electro magnet 126.

The electro magnet 126 comprises a soft iron ring for some applications or a flexible core of Barium Ferrite which is weak by itself, but when used in an electro magnet 126 with power supplied to its copper coil it becomes strong and thus will control the movement of the forward lens element in the same way as the proportional solenoids do in the previous patent for similar lens units such as illustrated in FIG. 13. There are many advantages, mainly size and weight also cost and less current to operate. The radialized ring magnet 125 is connected to the stabilizer ring 19 and moves away from the electro magnet when energized by the current control power supply. There is an additional S-shaped circular channel 87 used to facilitate the outward and inward movement of the lens element 136 due to less resistance around the periphery connected to the reservoir 5 which is connected also to lens element 137. This S-shaped circular channel 87 allows movement forward or rearward while maintaining alignment of the lens element 136. The electro magnet 126 is connected to the rearward lens element inner surface 9. This lens unit uses the previous radial channels 18 as are used in the previous patent. Also many of the same features as those used for FIG. 13 are incorporated to greatly improve this lens unit.

This lens unit is powered and operated by the same current controlled power supply No. 37 as shown and described in the prior patent.

FIG. 23 shows the lens unit of FIG. 22 except that the position of the permanent magnet 125 and electro magnet 126 are mounted in reverse order and the forward lens element 136 is stationery while the rearward lens element 137 is moveable. This will provide negative focal power, and is the opposite of FIG. 22 as its operation goes. In this application the magnets try to attract each other, e.g. North pole to South pole. Current controlled power supply No. 37 powers this lens unit.

FIG. 24 has the same basic construction as that of FIG. 22 except that it has a permanent magnet 125 with an additional copper coil 131 surrounding it to energize the clear magnetic fluid oil 133 to have e.g. a North pole facing rearward and the electro magnet 126 on the rearward lens generates a South pole when in operation while also having an additional copper coil of wire 132 to create a flow of electrons from one side of the lens unit to the other side of the lens unit where the other copper coil 131 creates a flow of electrons from one side to the other which will energize the clear magnetic fluid oil 133 so that the oil 133 facing the permanent magnet 125 will produce e.g. a North pole or poles and the other side of the oil 133 facing the electro magnet will produce a South pole or poles to repel and move the forward lens outward. This operation can be reversed to produce the negative focal power. The DC current will energize the ionized particles and arrange them in order to create a magnetic field of a North pole or poles on one side and a South pole or poles on the other side of that clear magnetic fluid oil 133 in between the lens elements 136 and 137. Current controlled power supply No. 37 powers this lens unit.

Another flexible lens material 136 that is transparent, that can be used as a forward lens material, and also being able to conduct an electric current allowing it to work in conjunction with either the magnetic fluid oil or the electro ring magnets is an intrinsically conductive polymer known as Polyaniline. Polyaniline is an organic metal. Being that the Polyaniline material posseses a molecular structure of atoms and particles capable of conducting electrical current and that they can also be magnetically arranged, the molecular particles of this material can be magnetically arranged forming e.g. a magnetic North pole that can be magnetically repelled from a magnetic alignment between the forward lens members North pole and the generated North pole of the electro ring magnet on the rearward lens. The electro ring magnet is affixed to the rigid and stationary rearward lens. This material is transparent and with a light green tint having an index of refraction of approximately 1.5 making it an ideal lens material for eliminating the ultra violet rays and bright sunlight when used in the Lens Units 31A and 32A respectively. This material is manufactured by the Allied Signal Company, located in Morristown, N.J.

Americhem Inc. of Cuyahoga Falls, Ohio produces coatings which are dispersions of Versicon® in a film forming matrix. This compound can be injection molded for the lens members both flexible and rigid. Versicon® is made from Polyaniline.

FIG. 25 is an eyeglass frame that can house lens units 31A and 32A as illustrated in FIGS. 22 through 24 used for typical operation showing the power supply, the head band, radar, and other previous features as that shown in the previous patent.

Focal distance measurement is accomplished preferably by using a combined Radar-sending and receiving device. Other types of units, e.g., microwave, are also possible.

The principles are basically the same as those used in the previous patent to achieve positive focal power by mainly creating a sharper radius on the forward and outer lens surface 96 as that compared to the rearward outer lens surface 101. Magnet Sales & Manufacturing Company of Culver City, Calif. is a supplier of magnets in flexible binder material. The lens material for both the flexible lens elements and the stationary lens elements can be made of a clear optical grade of Polyethylene Terephthalate, one particular grade is Ektar GN0005 Co Polyester with an index of refraction of approximately 1.56. Another Terephthalate base grade with a chemical name of Cyclohexol Dimethanol and having a different monomer content is Ektar DN004 with similar optical characteristics, but having a better flow of material during the injection molding process.

The index of refraction of the Polyethelene Terephthalate is very close to that of Polycarbonate. The Polyethelene Terephthalate material grade Ektar GN005 Co Polyester is a primary grade that is co-polyester glycol modified with a mold release agent for injection molding. The Ektar GN005 is in the same famility as Kodar PETG Co Polyester 6763 which is also a co-polyester glycol modified Polyethelene Terephthalate. There are also two other grades, Kodapak PET Polyester 7352 and Kodapak PET Co Polyester 9921 that can be used for lens material. These latter two grades are commonly used for clear soda bottle material. Polyethelene Terephthalate is also known as PET. This material has good moisture barrier resistance to retain liquids, gases, etc., and is flexibile at varying temperature. This material is made by Eastman Chemical Company, a division of Eastman Kodak located in Kingsport, Tenn. Another grade of lens material is Polycarbonate such as 121. This material is made by General Electric Company of Pittsfield, Mass. The index of refraction for the optical grade of Polycarbonate is approximately 1.58. These materials can be injection molded and coated as well as stamped from a sheet to include the radial channels and S-shaped circular channel, etc. for all of the lens units in this application as illustrated in FIGS. 18 through 25.

A hard surface compound can be put on the Polycarbonate lens surface to resist scratches, abrasions, etc., by the evaporation coating process. An anti-reflection coating can be applied by the evaporation coating process applied to the surface to increase the percentage of light transmitted through the lens elments to about 95%. The Younger Optical Company of Los Angeles, Calif. is a supplier of this lens material.

The lenses can be assembled to the C-ring reservoir with an Ultra-Violet curing adhesive. This adhesive makes use of Photo Initiators and is comprised of Polyurethane Oligomer Mixtures. The adhesive uses a special Ultra-Violet curing lamp that operates on a frequency of 365 Nanometers with a 60 millisecond/Sq. cm. output. The curing takes place in about 20 seconds. The Ultra-Violet light affects the Photo Initiators at the 365 Nanometer frequency and then curing (hardening) of the adhesive takes place. One such adhesive is No. 139M. a class VI medical grade manufactured by the Dymax Co., located in Torrington, Conn.

FIG. 22 shows a lens unit using a permanent flexible magent made of Neodymium Iron Boron in a flexible rubber binder 125 exhibiting a North pole to be repelled from the magnetic force of similar North poles from the electro magnet 126.

The electro magnet 126 comprises a soft iron ring for some applications or a flexible core of Barium Ferrite which is weak by itself, but when used in an electro magnet 126 with power supplied to its copper coil it becomes activated and strong, and thus will control the movement of the forward lens element in the same way as the proportional solenoids do in the previous patent for similar lens units such as illustrated in FIG. 13. There are many advantages, mainly size and weight also cost and less current to operate. The radialized ring magnet 125 is connected to the stabilizer ring 19 and moves away from the electro magnet when energized by the current control power supply. There is an additional S-shaped circular channel 87 used to facilitate the outward and inward movement of the lens element 136 due to less resistance around the periphery connected to the reservoir 5 which is connected also to lens element 137. This S-shaped circular channel 87 allows movement forward or rearward while maintaining alignment of the lens element 136. The electro magnet 126 is connected to the rearward lens element inner surface 9. This lens unit uses the previous radial channels 18 as are used in the previous patent. Also many of the same features as those used for FIG. 13 are incorporated to greatly improve this lens unit.

This lens unit is powered and operated by the same current controlled power supply No. 37 as shown and described in the prior patent, and further on.

FIG. 23 shows the lens unit of FIG. 22 except that the position of the permanent magnet 125 and electro magnet 126 are mounted in reverse order and the forward lens element 136 is stationery while the rearward lens element 137 is moveable. This will provide negative focal power, and is the opposite of FIG. 22 as its operation goes. In this application the magnets try to attract each other, e.g. North pole to South pole. Current controlled power supply No. 37 powers this lens unit.

FIG. 24 has the same basic construction as that of FIG. 22 except that it has a permanent magnet 125 with an additional copper coil 131 surrounding it to energize the clear magnetic fluid oil 133 to have e.g. a North pole facing rearward and the electro magnet 126 on the rearward lens generates a South pole when in operation while also having an additional copper coil of wire 132 to create a flow of electrons from one side of the lens unit to the other side of the lens unit where the other copper coil 131 creates a flow of electrons from one side to the other which will energize the clear magnetic fluid oil 133 so that the oil 133 facing the permanent magnet 125 will produce e.g. a North pole or poles and the other side of the oil 133 facing the electro magnet will produce a South pole or poles to repel and move the forward lens outward.

This operation can be reversed to produce negative focal power. The DC current will energize the ionized particles and arrange them in order to create a magnetic field of a North pole or poles on one side and a South pole or poles on the other side of that clear magnetic fluid oil 133 in between the lens elements 136 and 137. Current controlled power supply No. 37 powers this lens unit.

Another flexible lens material 136 that is transparent, that can be used as a forward and lens material, and also being able to conduct an electric current allowing it to work in conjunction with either the magnetic fluid oil or the electro ring magnets is an intrinsically conductive polymer known as Polyaniline. Polyaniline is an organic metal. Being that the Polyaniline material posseses a molecular structure of atoms and particles capable of conducting electrical current and that they can also be magnetically arranged by said electrical current the molecular particles of this material can be magnetically arranged forming e.g. a magnetic North pole that can be magnetically repelled to form an electronically and magnetically convex formed three-axis particle radius curvature facing outwardly and forward within the Polyaniline lens member, with a slight concave radius curvature on its rearward portion of the lens member while in juxtaposed magnetic alignment between the forward lens members North pole and the generated North pole of the electro ring magnet affixed to the lens frames 22 and 23 thus generating positive focal power. In arrangement two, the electro ring magnet is affixed to the rigid and stationary rearward lens used with the Polyaniline as a front lens member. This material is transparent and with a light green tint having an index of refraction of approximately 1.5 making it an ideal lens material for eliminating the ultra violet rays and bright sunlight when used in the Lens Units 31A and 32A respectively. This material is manufactured by the Allied Signal Company, located in Morristown, N.J.

Americhem Inc. of Cuyahoga Falls, Ohio produces coatings which are dispersions of Versicon® in a film forming matrix. This compound can be injection molded for the lens members both flexible and rigid. Versicon® is made from Polyaniline.

FIG. 25 is an eyeglass frame that can house lens units 31A and 32A as illustrated in FIGS. 22 through 24 used for typical operation showing the power supply, the head band, radar, and other previous features as that shown in the previous patent.

The Radar sending and Radar receiving unit 33 is combined together for use in this invention. The sending and receiving Monastatic antenna 47 is covered with a protective cover called a Radome 34. There are various bands of frequency operation in Giga Hertz. An RF amplifier with Micro Chip circuitry is connected to increase the radio frequency output signal 50 for distant objects. This amplifier is coupled to Radar unit 33 on eyeglass frame 24 to comprise one unit 33. The signal 50 sent out hits the object 56 and return signal 60 is received by the receiver, then fed into the Analog Micro Chip circuitry that down converts high RF to low RF and then to Sampler Converter Micro Chip circuitry.

The Sampler converts the radio frequency to voltage. Then the voltage is fed into a Closed Loop Circuit using Micro Chip circuitry with Range Gating to give an accurate measure of distance when the transmitted signal 50 hits an object 56 at various angles along with a straight ahead angle of 90°. The resulting output voltage is proportional to the distance that has been measured. The Radar unit 33 is powered by current from battery 41 in case 42 through harness 45 which also carries the output voltage to an Electronic Converter 48. The Electronic Converter 48 then sends a controlling signal voltage to the Current controlled power supply 37.

With the output current of the power supply 37 varying in proportion to the distance which has been measured by the Radar unit 33, this controlled output from 37 is connected to the Lens Units 31A and 32A and now varies the Lens Units 31A and 32A equally and proportionally respectively. This is from a starting point with the Lens Units 31A and 32A either retracted at a zero position or at a maximum amount of expansion supplying either positive or negative focal power. With the output the Lenses 1 and 1 of Lens Units 31A and 32A will vary equally and proportionally as well as giving the correct variable focal power for the varying distances. This results in automatic focusing for the eyeglasses.

No. 42 is the case for battery and Converter, 48, wire harness 45 for sending unit 33. Power supply 37 to wire harness 43. Harness 43 also supplies power to the Lens Units 31A and 32A. Power supply 38 to wire harness 44. Harness 44 can also supply power separately to Lens Unit 32A if used independently of each other for special applications. Two power supplies are shown, but one is sufficient for normal use. An Electronic Converter 48 is mounted in case 42 that also houses the battery 41.

The signal comes from Radar sending and receiving Unit 33 and then is sent to an Electronic Converter 48 inside case 42, and then the output controls the power supply 37 that can supply power to both Lens Units 31A and 32A at the same time or supply current to both Lens Units 31A and 32A independently respectively. Power supplies can be either a Current controlled power supply or a battery back power supply. The Current controlled power supply maintains voltage and varies the Current enabling the Lens Units 31A and 32A to move in precise amounts of travel. Battery 41 is a portable battery in case 42 supplying power for the Radar sending and receiving unit 33, the Electronic Converter 48 and the Current controlled power supply, which in turn powers the Lens Units 31A and 32A.

The lenses in FIGS. 22–25 can be coated with an anti-fog compound called "Vacuum Film Deposition" to stop fogging up of the outer surfaces 6 and 7 of the lenses 1 and 2, and to give better usefulness for all environments. The lenses can also be coated with other coatings to improve abrasion resistance and minimize reflection and glare if desired without affecting focal power. In normal operation the Lens Units shown in FIGS. 22–24 are mounted in frame housing 22 for Lens Unit 31A and frame housing 23 for Lens Unit 32A respectively of eyeglass frame 24 as shown in FIG. 25, with the Lens Units designated as 31A and 32A.

Now with the individual wearing the automatic focusing eyeglasses shown in FIGS. 25, all the individual has to do is just look at an object straight ahead near or far and the Lens Units 31A and 32A in frame housings 22 and 23 of frame 24 will focus together so the object can be seen clearly and distinctly.

When the individual looks directly straight ahead at an object or road ahead, a beam 50 is sent out from the Radar sending and receiving unit 33 mounted on eyeglass frame 24 in outer top center front after which a beam 60 is sent back from object 56 generating a signal value in relationship to the distance proportionally.

The frequency of the Radar Unit 33 is different from other standard Radar in use e.g., navigation, police etc. The signal is fed into Electronic Converter 48 which in turn controls the Current controlled power supply 37 (power from the battery 41 is fed into power supply 37) or similar power supply, thereby supplying a specific amount of current to the Lens Units 31A and 32A supplying equal amounts of travel respectively for the lens movements.

This amount of lens movement from the magnets will now automatically focus the Lens Units 31A and 32A for the object aimed at straight ahead by the eyeglass frame 24.

Case 42 holds a battery 41 which supplies the power for the components, 33, 35, 36, 37, 38, and 48 and any other electrical parts associated with components 33, 35, 36, 37, 38 and 48. The distance of an object sighted is directly related to the focal power required of the Lens Units 31 and 32 for the individual wearing the auto focusing eyeglasses. The auto focusing eyeglasses described in FIGS. 16 and 17 once adjusted for a given value of maximum focal power will be interchangeable with another patient requiring equal eyeglass focal power prescription. This is standardization of product.

Case 42 can be carried in a pocket or in a pouch attached to a belt, etc. Wiring harness 43, 44, and 45 can be worn under a coat, etc. to achieve a more compact product battery 41 could be mounted on 20 of eyeglass frame 24 with Electronic Converter 48 mounted on 21 of eyeglass 24 using same wiring harnesses 43, 44 and 45 respectively, to give a completely portable auto focusing eyeglass product less case 42.

Focal distance measurement is accomplished preferably by using a combined Radar-sending and receiving device. Other types of units, e.g., microwave, are also possible.

While I have herein shown and described one embodiment of the invention, and have suggested certain changes and modifications thereto, it will be apparent to those of ordinary skill in the art who have read this description that still further changes and modifications may be made therein without departing from the spirit and scope of the invention.

I claim:

1. A lens system for infinitely variable focal power comprising:
    a first lens element and a second lens element mounted adjacent to each other with said first lens element being a forward lens, closer to an object to be viewed, and said second lens element being a rearward lens, further from said object to be viewed;
    wherein said first and second lenses' inner surfaces are mounted in juxtaposed relationship with a space formed between said lenses' inner surfaces for receiving a transparent fluid medium there between;
    a circular reservoir being substantially C-ring shaped in cross section to contain the transparent fluid medium between said first and second lenses;
    said circular reservoir and stablizer rings connected to said first lens and said second lens by an adhesive;
    a set of current connection wires and other components connected to the circular reservoir by said adhesive;
    said forward lens, and said rearward lens form lens units;
    an electromagnet affixed to the rearward lens, the electromagnet being connected to a power supply; and
    a permanent magnet affixed to the forward lens and being magnetically aligned so that its north pole is adjacent to the north pole of the electromagnet, when the electromagnet is energized;
    an electromagnet affixed to the forward lens, the electro magnet being connected to a power supply; and
    a permanent magnet affixed to the rearward lens and being magnetically aligned so that its south pole is adjacent to the south pole of the electromagnet, when the electromagnet is energized.

2. A lens system as described in claim 1 wherein; said transparent fluid medium is a polydimethylsiloxane polymer oil.

3. A lens system as described in claim 1 wherein;
    said electromagnet is affixed to the rearward lens with the electromagnet being connected to a power supply; to generate a north pole supplying an amount of magnetic force to repel the north pole of a permanent magnet affixed to the forward lens and being magnetically aligned so that its north pole is adjacent to the north pole of the electromagnet when the electromagnet is energized to supply an infinitely variable positive focal power.

4. A lens system as described in claim 1 wherein;
    said electromagnet is affixed to the forward lens, the electromagnet being connected to a power supply; to generate a north pole supplying an amount of magnetic force to attract the south pole of a permanent magnet affixed to the rearward lens and being magnetically aligned so that its south pole is adjacent to the north pole of the electromagnet when the electromagnet is energized to supply an infinitely variable negative focal power.

5. A lens system as described in claim 1 wherein the lens units are calibrated with a diopter gauge, to establish a definite zero diopter starting point for either positive or negative focal power lens units.

6. A lens system as described in claim 1 further comprising a circular channel on each lens for facilitating movement of each lens, said circular channels being substantially S-shaped in cross section.

7. A lens system as described in claim 1 wherein the forward and rearward lens elements are composed of material comprising polyethylene terephthalate.

8. A lens system as described in claim 1 wherein the forward and rearward lens elements are composed of a material comprising polycarbonate.

9. A lens system as described in claim 1 wherein: the lenses and adjacent current connection wires are assembled to the C-ring reservoir and to each other with an ultra-violet curing adhesive.

10. A lens system as described in claim 1 further comprising:
    a reservoir around the perimeter of said rearward and forward lenses' edges in fluid communication with the space between said lenses' inner surfaces;
    a transparent liquid located in said reservoir and filling said space between said lenses inner surfaces; and wherein the transparent fluid comprises an electrically conductive oil.

11. A lens system as described in claim 1 wherein: the lenses are composed of a material comprising intrinsically conductive polymer.

12. A lens system as described in claim 1 wherein: the lenses are composed of a material comprising polyaniline.

13. A lens system as described in claim 1 further comprising:
a reservoir around the perimeter of said rearward and forward lenses' edges in fluid communication with the space between said lenses' inner surfaces;
a transparent liquid located in said reservoir and filling said space between said lenses' inner surfaces, and
a circular channel on each lens for facilitating rearward and forward movement of each lens, the circular channel connecting the forward and rearward lenses.

14. A lens system as described in claim 13 wherein:
the electromagnet has a core which is a permanent magnet composed of barium ferrite in a flexible binder; and
the permanent magnet on the forward lens is composed of neodimium iron boron in a flexible binder; and
said magnets are ring magnets circumferentially mounted on the periphery of the lens element members magnetized with conventional poles.

15. A lens system as described in claim 14 further comprising:
a radar control device in communication with the power supply for operating the electromagnet.

16. A lens system as described in claim 14 further comprising:
an antireflective coating applied to the forward lens.

17. A lens system as described in claim 14 wherein:
the rearward lens is substantially rigid and stationary, and the forward lens is flexible and moves forward and rearward for infinitely variable positive focal power.

18. A lens system as described in claim 14 wherein:
the forward lens is substantially rigid and stationary, and the rearward lens moves rearward and forward for infinitely variable negative focal power.

19. A lens system for infinitely variable focal power comprising:
a first lens and a second lens mounted adjacent to each other with said first lens being a forward lens, closer to an object to be viewed, and said second lens being a rearward lens further from said object to be viewed;
wherein said first and second lenses' inner surfaces are mounted in juxtaposed relationship with a space formed between said lenses' inner surfaces;
first and second control members in mechanical communication with said forward and rearward lenses respectively, adapted to translate said lenses in forward and rearward directions;
a radar system in electrical communication with the control members, for activating the control members having a housing and further comprising a transmitting means, mounted in the housing for transmitting a signal; a receiving means mounting in the housing for receiving return signals; an RF converter having analog microchip circuitry, in electronic communication with the receiving means, for converting high RF signals received into low RF; a sampler converter in electronic communication with the RF converter, for convering low RF to voltage, a closed loop circuit with range gating in electronic communication with the sampler converter, to measure distance to objects when the transmitted signal hits objects at various angles, wherein the resultant voltage is proportional to the distance being measured.

20. A lens system for infinitely variable focal power comprising:
a first lens and a second lens mounted adjacent to each other with said first lens being a forward lens, closer to an object to be viewed, and said second lens being a rearward lens, further from said object to be viewed;
wherein said first and second lenses' inner surfaces are mounted in juxtaposed relationship with a space formed between said lenses' inner surfaces;
first and second control members in mechanical communication with said forward and rearward lenses respectively adapted to translate said lenses in forward and rearward directions;
a radar system in electrical communication with the control members, for activating the control members having a housing and further comprising a transmitting means, mounted in the housing for transmitting a signal; a receiving means mounted in the housing for receiving return signals; an RF converter having analog microchip circuitry, in electronic communication with the receiving means, for converting high RF signals received into low RF; a sampler converter in electronic communication with the RF converter, for converting low RF to voltage, a closed loop circuit with range gating in electronic communication with the sampler converter, to measure distance to objects when the transmitted signal hits objects at various angles, wherein the resultant voltage is proportional to the distance being measured; and an electronic converter in electronic communication with the closed loop circuit which sends a controlling signal voltage to activate said control members.

21. A lens system for infinitely variable focal power comprising:
a first lens and a second lens mounted adjacent to each other with said first lens being a forward lens, closer to an object to be viewed, and said second lens being a rearward lens, further from said object to be viewed;
wherein said first and second lenses' inner surfaces are mounted in juxtaposed relationship with a space formed between said lenses' inner surfaces for receiving an electromagnet affixed to the rearward lens, the electromagnet being connected to a power supply to generate a north pole supplying an amount of magnetic force to repel the north pole of a permanent magnet affixed to the forward lens and being magnetically aligned so that its north pole is adjacent to the north pole of the electromagnet when the electromagnet is energized, supplying infinitely variable positive focal power.

22. A lens system for infinitely variable focal power comprising:
a first lens and a second lens mounted adjacent to each other with said first lens being a forward lens, closer to an object to be viewed, and said second lens being a rearward lens, further from said object to be viewed;
wherein said first and second lenses' inner surfaces are mounted in juxtaposed relationship with a space formed between said lenses' inner surfaces for receiving an electromagnet affixed to the forward lens, the electromagnet being connected to a power supply to generate a north pole supplying an amount of magnetic force to attract the south pole of a permanent magnet affixed to the rearward lens and being magnetically aligned so that its south pole is adjacent to the north pole of the electromagnet when the electromagnet is energized, supplying infinitely variable negative focal power.

* * * * *